United States Patent
Yanikomeroglu et al.

(10) Patent No.: US 10,219,234 B2
(45) Date of Patent: Feb. 26, 2019

(54) SYSTEM AND METHOD FOR PROVIDING ADAPTIVE SYNCHRONIZATION OF LTE COMMUNICATION SYSTEMS

(71) Applicant: Allen-Vanguard Corporation, Ottawa (CA)

(72) Inventors: Halim Yanikomeroglu, Ottawa (CA); Amr El-Keyi, Ottawa (CA); Oktay Ureten, Ottawa (CA); Trevor Noel Yensen, Ottawa (CA)

(73) Assignee: Allen-Vanguard Corporation, Ottawa (CA)

(*) Notice: Subject to any disclaimer, the term of this patent is extended or adjusted under 35 U.S.C. 154(b) by 6 days.

(21) Appl. No.: 15/680,164

(22) Filed: Aug. 17, 2017

(65) Prior Publication Data

US 2018/0054787 A1    Feb. 22, 2018

Related U.S. Application Data

(60) Provisional application No. 62/376,477, filed on Aug. 18, 2016.

(51) Int. Cl.
| | |
|---|---|
| H04W 56/00 | (2009.01) |
| H04B 15/00 | (2006.01) |
| H04L 7/00 | (2006.01) |
| H04L 5/14 | (2006.01) |
| H04J 11/00 | (2006.01) |
| H04W 84/04 | (2009.01) |
| H04L 5/00 | (2006.01) |
| H04L 27/26 | (2006.01) |

(52) U.S. Cl.
CPC .......... *H04W 56/001* (2013.01); *H04B 15/00* (2013.01); *H04J 11/0066* (2013.01); *H04J 11/0073* (2013.01); *H04J 11/0076* (2013.01); *H04L 5/1438* (2013.01); *H04L 7/0079* (2013.01); *H04L 5/0048* (2013.01); *H04L 5/14* (2013.01); *H04L 27/2657* (2013.01); *H04W 84/042* (2013.01)

(58) Field of Classification Search
CPC .............. H04W 56/001; H04W 84/042; H04J 11/0073; H04J 11/0066; H04J 11/0076; H04L 5/1438; H04L 7/0079; H04L 27/2657; H04L 5/0048; H04L 5/14; H04B 15/00

See application file for complete search history.

(56) References Cited

U.S. PATENT DOCUMENTS

| | | | | |
|---|---|---|---|---|
| 2009/0257536 | A1* | 10/2009 | Grbic | G10L 21/0208 375/350 |
| 2012/0224456 | A1* | 9/2012 | Visser | G01S 3/8006 367/127 |
| 2016/0300563 | A1* | 10/2016 | Park | G10K 11/17853 |

* cited by examiner

*Primary Examiner* — Thai Nguyen
(74) *Attorney, Agent, or Firm* — Elan IP Inc.

(57) ABSTRACT

A method for long-term evolution (LTE) synchronization by a signal receiver in the presence of interference signals including providing multiple parallel adaptive filters to eliminate the contribution of an interference signal to a timing metric of an LTE signal; wherein coefficients of each of the parallel adaptive filters are determined using a linearly constrained minimum variance (LCMV) criterion to minimize output power of each filter subject to the LCMV criterion that preserves received signal vectors corresponding to all possible primary synchronization signal signatures; and wherein the LCMV criterion are updated iteratively using a recursive least squares (RLS) algorithm.

20 Claims, 15 Drawing Sheets

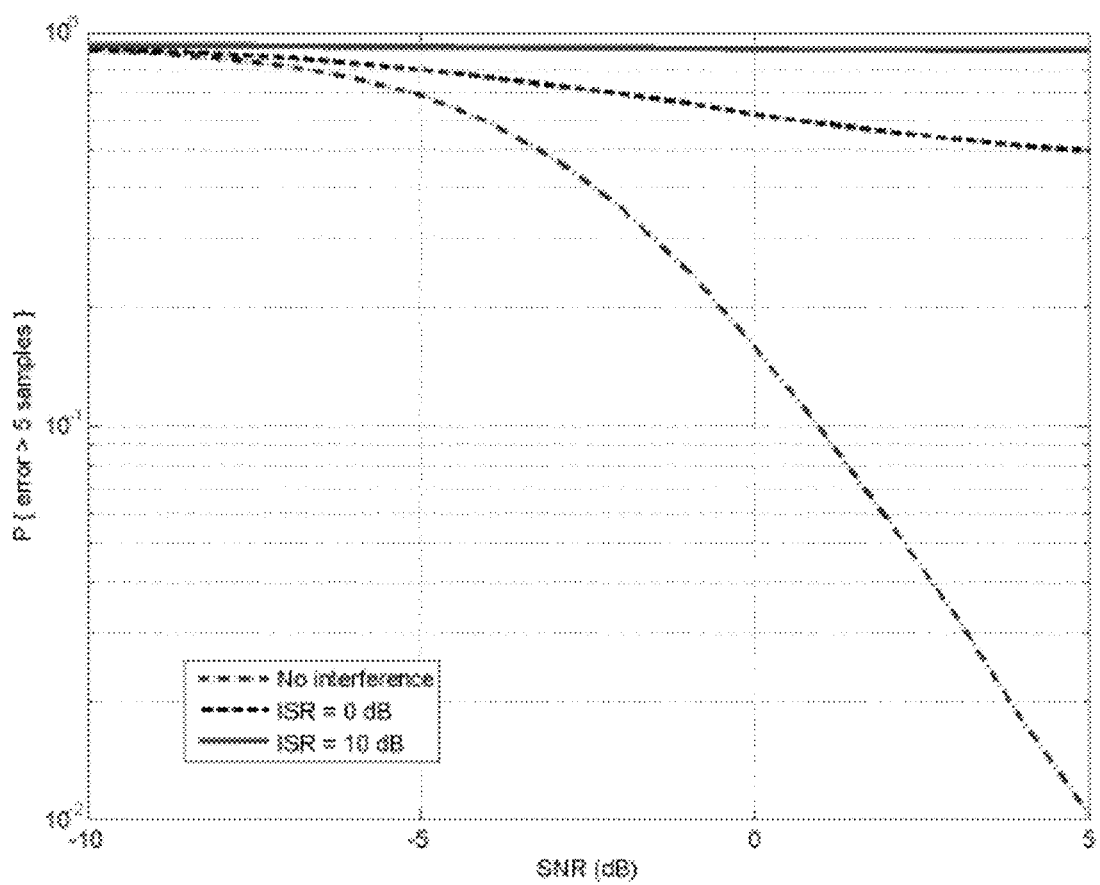
Fig. 2: Probability of error in finding the location of the OFDM symbol with at least five samples accuracy.

SYSTEM AND METHOD FOR PROVIDING ADAPTIVE SYNCHRONIZATION OF LTE COMMUNICATION SYSTEMS

TECHNICAL FIELD

This invention relates generally to adaptive synchronization for communication systems, and more particularly to adaptive synchronization of long-term evolution (LTE) communication systems, for example to provide robustness in high interference environments.

BACKGROUND

The LTE (long-term evolution) wireless communication standard is currently the primary standard for 4G cellular technology. Broadly, LTE supports a wide variety of services, from high bandwidth data services to real-time communication services from a common IP (internet protocol) based network. The LTE standard is based on an OFDM (orthogonal frequency-division multiplexing) method of encoding digital data.

Recently, the United States government has mandated the creation of FirstNet (The First Responder Network Authority) for the purposes of operating and maintaining an interoperable public safety broadband network. It is anticipated that various other governments will adopt similar agencies and public-safety networks. LTE has been selected as the next communication technology to support the public safety networks defined by FirstNet.

It is generally known that OFDM-based systems, such as LTE, are sensitive to timing and frequency synchronization errors. These errors have in the past been exploited for the purposes of jamming attacks which target LTE synchronization symbols to cause denial of service for devices joining an LTE network.

One approach for improving the performance of LTE devices in hostile jamming environments is to make use of adaptive synchronization improvements to the LTE operating environment. Adaptive synchronization is known in the prior art and has been proposed for OFDM based communication systems over power lines (see for example S. Aghajeri and H. Shafiee, "*Synchronization in OFDM powerline communication systems in presence of narrowband interferences*," in Proc. International Symposium on Signal Processing and Its Applications, July 2003, vol. 2, pp. 359-362.

However, the prior art has its limitations, particularly in terms of its robustness and performance to different types of interference. For example, there is a need in the art for an improved adaptive synchronization method for applications where there is a threat of partial-band stationary jamming or interference.

SUMMARY OF THE INVENTION

In one embodiment of the invention, there is disclosed a system and method for implementing a synchronization algorithm for LTE systems that enable the detection and elimination of partial-band interference signals via adaptive filtering.

The filter coefficients in the adaptive filtering algorithm are preferably designed according to the linearly constrained minimum variance (LCMV) design criterion and are updated iteratively using a recursive least squares (RLS) algorithm. The proposed algorithm utilizes weighted frequency-domain correlation with stored PSS and SSS signature waveforms to detect the cell identity, duplex mode, and CP mode. Weighted frequency domain processing of the received primary synchronization signal (PSS) and secondary synchronization signal (SSS) are also utilized for CFO estimation.

Accordingly, in one embodiment of the invention there is provided a method for long-term evolution (LTE) synchronization by a signal receiver in the presence of interference or jamming signals that includes providing multiple parallel adaptive filters to eliminate the contribution of an interference signal to a timing metric of an LTE signal; wherein coefficients of each of the parallel adaptive filters are determined using a linearly constrained minimum variance (LCMV) criterion to minimize output power of each filter subject to the LCMV criterion that preserves received signal vectors corresponding to all possible primary synchronization signal signatures; and wherein the LCMV criterion are updated iteratively using a recursive least squares (RLS) algorithm.

In one aspect of the invention, the method includes detecting a primary synchronization signal (PSS) waveform, detecting a secondary synchronization signal (SSS) waveform, and using the detected primary and secondary synchronization signal waveforms to detect a cell identity, duplex mode and cyclic prefix (CP) mode of the LTE signal.

In one aspect of the invention, the method includes using the PSS and the SSS waveforms for determining a carrier frequency offset (CFO) of the LTE signal.

In one aspect of the invention, the step of updating iteratively further comprises converting the LCMV criterion using an adaptive generalized sidelobe canceller (GSC) process; wherein GSC filter coefficients are updated iteratively using the RLS algorithm.

In one aspect of the invention, the PSS waveform is obtained from outputs of the filters.

In one aspect of the invention, the frequency response of the filters at the time of detection of the PSS provides information about the power spectral density (PSD) of the jamming/interference signal.

In one aspect of the invention, after detecting the PSS waveform, the method further comprises determining a weighted cross-correlation in the frequency domain between a PSS vector and a PSS signature, whereby the magnitude of the frequency response of the LCMV filters at a PSS detection time is used to weight a contribution of different subcarriers to the weighted cross-correlation metric such that the contribution of the interference signal to the cross-correlation metric is eliminated.

In one aspect of the invention, the SSS waveform is obtained from outputs of the filters.

In one aspect of the invention, the method includes determining the duplexing and cyclic prefix modes of the LTE system, the physical-layer cell identity and the frame timing information based on the determined PSS and SSS waveforms.

In one aspect of the invention, the method includes estimating the CFO by joint processing of a discrete Fourier transform of the PSS and SSS waveforms in the frequency domain.

In another embodiment of the invention, there is disclosed a system for long-term evolution (LTE) synchronization in the presence of interference or jamming signals including a signal receiver for receiving an LTE signal affected by an interference signal, multiple parallel adaptive filters to eliminate the contribution of the interference signal to a timing metric of an LTE signal, wherein coefficients of each of the parallel adaptive filters are determined by the signal processor using a linearly constrained minimum variance (LCMV) criterion to minimize output power of each filter subject to the LCMV criterion that preserves received signal vectors corresponding to all possible primary synchronization signal signatures, and wherein the LCMV criterion are updated iteratively using a recursive least squares (RLS) algorithm; and a signal recorder for recording an output of the signal processor indicative of the LTE signal with the interference signal removed.

In one aspect of this embodiment, the signal processor is configured to detect a primary synchronization signal (PSS) waveform and a secondary synchronization signal (SSS) waveform, and to use the detected primary and secondary synchronization signal waveforms to determine a cell identity, duplex mode and cyclic prefix (CP) mode of the LTE signal.

In another aspect of this embodiment, the signal processor uses the PSS and the SSS waveforms to determine a carrier frequency offset (CFO) of the LTE signal.

In another aspect of this embodiment, the signal processor converts the LCMV criterion using an adaptive generalized sidelobe canceller (GSC) process; wherein GSC filter coefficients are updated iteratively using the RLS algorithm.

In another aspect of this embodiment, the PSS waveform is obtained from outputs of the filters.

In another aspect of this embodiment, the frequency response of the filters at the time of detection of the PSS provides information to the signal processor about the power spectral density (PSD) of the interference signal.

In another aspect of this embodiment, the signal processor further determines a weighted cross-correlation in the frequency domain between a PSS vector and a PSS signature, whereby the magnitude of the frequency response of the LCMV filters at a PSS detection time is used to weight a contribution of different subcarriers to the weighted cross-correlation metric such that the contribution of the interference signal to the cross-correlation metric is eliminated.

In another aspect of this embodiment, the SSS waveform is obtained by the signal processor from outputs of the filters.

In another aspect of this embodiment, the signal processor determines the duplexing and cyclic prefix modes of the LTE system, the physical-layer cell identity and the frame timing information based on the determined PSS and SSS waveforms.

In another aspect of this embodiment, the signal processor estimates the CFO by joint processing of a discrete Fourier transform of the PSS and SSS waveforms in the frequency domain.

BRIEF DESCRIPTION OF THE DRAWINGS

The invention is illustrated in the figures of the accompanying drawings which are meant to be exemplary and not limiting, in which like references are intended to refer to like or corresponding parts. Acronyms used in the description of the drawings are expanded upon in the description. Below is a listing of the drawings:

FIG. 2 shows the probability of error in finding the location of the OFDM symbol with at least five samples accuracy.

DETAILED DESCRIPTION OF THE INVENTION

Figure 1:
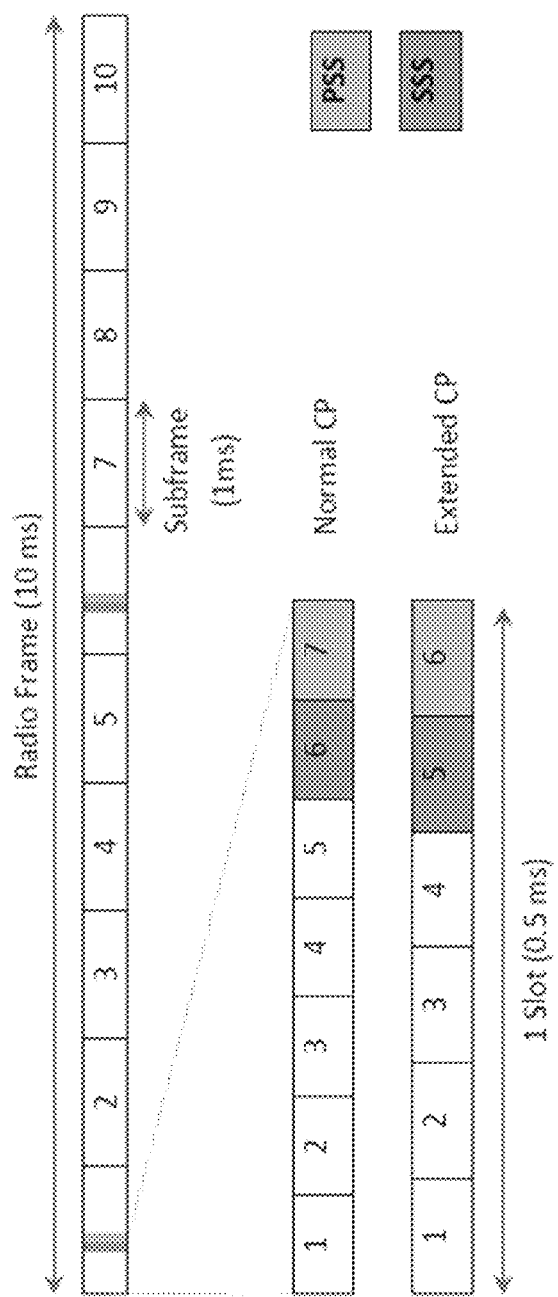
FIG. 1 shows synchronization signals in LTE FDD downlink.

By way of background, and for ease of understanding the invention, reference is now made to FIG. 1, which shows synchronization signals in frequency division duplex (FDD) downlinks of LTE networks. Primary and secondary synchronization signals (PSS and SSS, respectively) are transmitted twice in each radio frame and occupy the central 6 resource blocks where only 62 subcarriers out of 72 are used. The PSS is located in the last OFDM symbol of the first and eleventh slot. The location of the SSS immediately precedes the PSS in FDD mode.

The PSS is constructed from a frequency domain Zadoff-Chu (ZC) sequence of length 63. Three PSS sequences are used, depending on the Cell ID Sector. The SSS sequence is constructed from BPSK (binary phase shift keying) modulated m-sequences that depend on the Cell ID Sector as well as the Cell ID Group, which is an integer between 0 and 167.

The present invention proposes an adaptive minimum variance distortion-less response (MVDR) based form of LTE synchronization. The invention employs an adaptive interference-suppression filter that cancels any received signal other than the PSS signal. The output of the filter is used to locate the PSS signal in the downlink frame.

The frequency response of the filter at the detection instant of the PSS provides information about the power spectral density (PSD) of the interference signal. It is used to weight the contribution of different subcarriers during PSS and SSS decoding, and carrier frequency offset (CFO) estimation, typically all performed in the frequency domain.

Figure 3A:
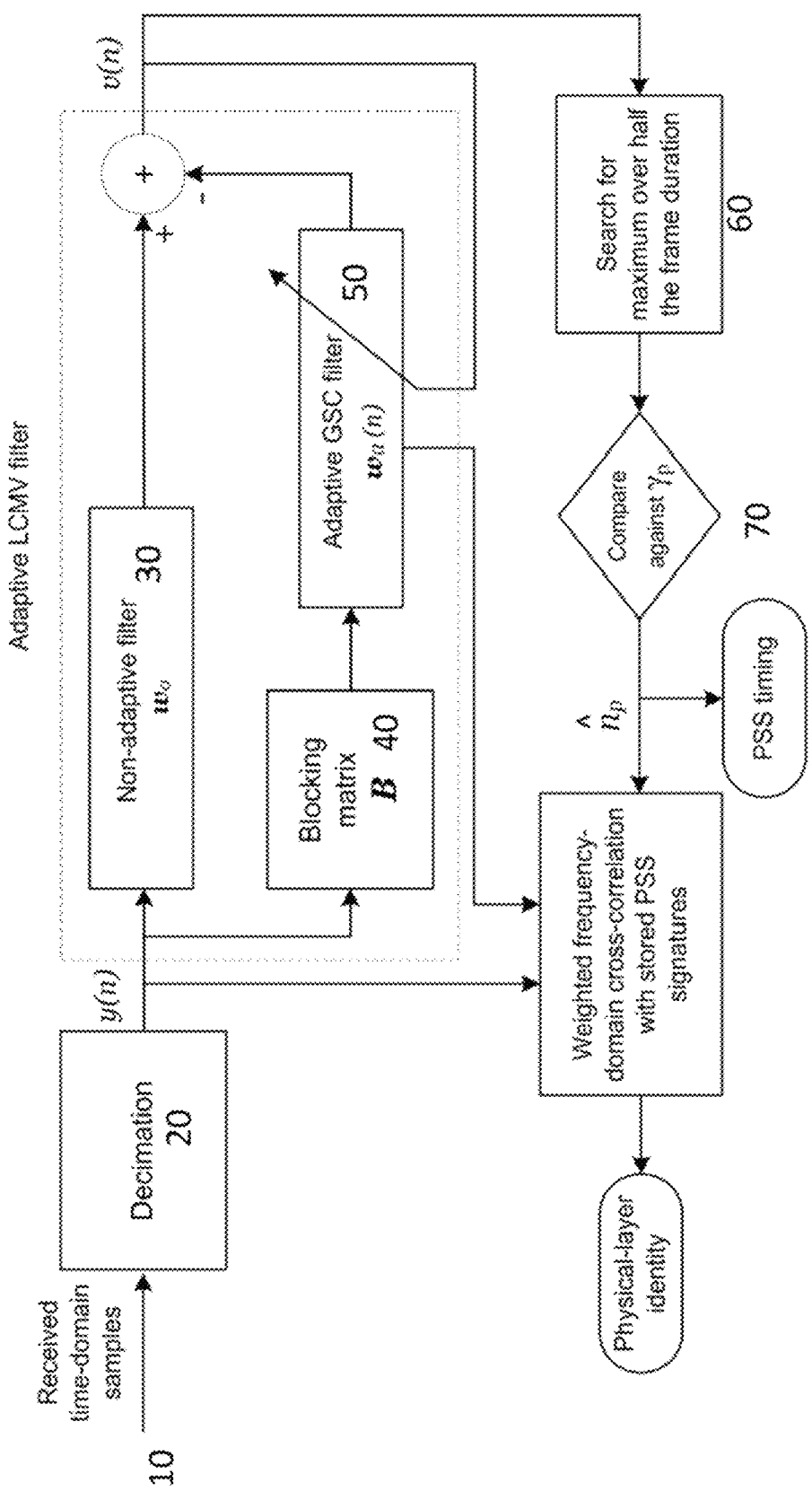
FIG. 3A shows a block diagram of one embodiment of the invention.

Referring now to FIG. 3A, there is shown one embodiment of the adaptive synchronization method of the invention. At 10, time-domain samples are received by a processor executing the algorithm implementing the method. The incoming samples are subjected to a decimation process 20, preferably at >=960 KHz to reduce the number of taps of the adaptive filter. The output of the decimation process are samples represented by y(n), which are then subjected to an initial non-adaptive filter at 30 which applies a weight $w_0$ and to a blocking matrix 40, which produces the coefficient B.

Following the blocking matrix 40, the samples are subjected to an adaptive GSC (generalized sidelobe canceller) filter 50, which applies the adaptive weight factor $w_a(n)$, designed via a linearly constrained minimum variance (LCMV) criterion; expressed as:

$$\min_{w(n)} w^H(n)R(n)w(n)$$

subject to  $w^H(n)c_i = 1$   for $i = 0, 1, 2$.

The filter coefficients are decomposed by GSC decomposition:

$$w(n) = w_0 - B w_a(n)$$

The adaptive weight vector is then updated via a recursive least squares (RLS) algorithm as follows:
Initializing $\hat{w}_a(0) = 0$ and $P(0) = \delta I$
Compute the gain k(n) as $$k(n) = \frac{P(n-1)B^H y(n)}{\lambda + y^H(n)BP(n-1)B^H y(n)}.$$

Update the filter coefficients and the associated covariance $$\hat{w}_a(n) = \hat{w}_a(n-1) + k(n)(y^H(n)w_0 - y^H(n)B\hat{w}_a(n-1))$$

$$P(n) = \frac{1}{\lambda}(P(n-1) - k(n)y^H(n)BP(n-1))$$

Compute the filter output $$v(n) = w_0^H y(n) - \hat{w}_a^H(n) B^H y(n)$$

At step 60, the algorithm searches for the maximum of |v(n)| over half the frame duration (typically 5 ms). At step 70, PSS detection is declared.

At step 80, the PSS and SSS are decoded. Weighted frequency domain cross-correlation is used to decode the PSS.

Weighted frequency domain cross-correlation is used to locate and to decode the SSS Finally, at step 90, the carrier frequency offset (CFO) is estimated by jointly processing a discrete Fourier transform of the received PSS and SSS.

In summary, the invention provides a robust synchronization algorithm and method for LTE systems that can detect and eliminate partial-band interference signals via the adaptive filtering approach as herein described. Specifically, it is considered to be new and inventive to apply filter coefficients designed according to the LCMV design criterion and updated iteratively using the RLS algorithm.

The algorithm and method of the invention use weighted frequency-domain correlation with stored PSS and SSS signature waveforms to detect the cell identity, duplex mode and CP mode of the device. Weighted frequency domain processing of the received PSS and SSS are also used for CFO estimation The remainder of this description is organized as follows. First, relevant features of LTE downlink synchronization signals are discussed. Then, a more detailed account and derivation of the adaptive synchronization method as embodied in an exemplary computer processor executable algorithm is described, followed by numerical simulations showing some of the improvements provided by the invention.

LTE Synchronization Signals

In this section, relevant characteristics of LTE downlink synchronization signals are reviewed with a focus on the frequency division duplex (FDD) mode of operation. The FDD downlink transmission is arranged in frames of 10 ms duration. Each frame is divided into ten subframes and each subframe consists of two slots of duration 0.5 ms. Each slot in turn consists of a number of OFDM symbols which can be either seven or six based on the CP mode. For the normal CP mode, the first symbol has a CP of length 5:2 µs while the remaining six symbols have a CP of length 4:69 µs. For the extended mode, CP duration is 16:67 µs for each OFDM symbol. The number of OFDM sub-carriers, $\overline{N}$, ranges from 128 to 2048, depending on the channel BW. The basic subcarrier spacing is 15 KHz, with a reduced subcarrier spacing of 7:5 KHz available for some transmission scenarios. For the 15 KHz spacing, the sampling rate is $\overline{f}_s = 15 \overline{N}$ KHz. In order to limit the overhead, downlink transmission is scheduled in units of resource blocks (RBs). Each RB consists of 12 consecutive sub-carriers and extends over the duration of 1 slot, i.e., each RB spans 180 KHz for the duration of 0.5 ms.

LTE FDD Downlink.

Two synchronization signals—the PSS and SSS—are broadcasted in the LTE downlink. The UE utilizes these signals in timing and frequency synchronization. In addition, the synchronization signals enable the UE to acquire some system parameters such as the cell identity, the CP length, and the duplexing mode. The synchronization signals are transmitted twice in each 10 ms radio frame. FIG. 1 shows the location of the synchronization signals within the LTE FDD downlink frame. The PSS is located in the last OFDM symbol of the first and 11th slot of each radio frame which allows the UE to acquire the slot boundary timing independent of the type of CP. In the FDD mode, the OFDM symbol corresponding to the transmission of the SSS immediately precedes that corresponding to PSS transmission. In contrast, when time-division duplexing (TDD) is employed, the SSS is located 3 OFDM symbols ahead of the PSS [24]. The PSS and SSS occupy the central six RBs, irrespective of system BW, which allows the UE to synchronize to the network without a priori knowledge of its BW.

The PSS is constructed from a frequency-domain Zadoff-Chu (ZC) sequence of length 63, with the middle element punctured to avoid transmitting on the dc subcarrier. The length-63 ZC sequence with root r is given by $$P_r^{63}(n) = \exp\left(-j\frac{\pi r n(n+1)}{63}\right) \text{ for } n = 0, 1, \ldots, 62. \quad (1)$$

Three PSS sequences are used in LTE, corresponding to three physical-layer identities. The selected roots for the three ZC sequences are r=25, 29, and 34 corresponding to physical-layer identities $N_{ID}^{(2)}$=0, 1, and 2, respectively.

Let $x_l(k)$ denote the information transmitted on the kth subcarrier of the lth OFDM symbol. Furthermore, let $x_l = [x_l(0), \ldots, x_l(\overline{N}-1)]^T$ denote the $\overline{N} \times 1$ vector containing the lth frequency-domain OFDM symbol where $(\blacksquare)^T$ denotes the vector transpose operation. The transmitted frequency-domain OFDM symbol corresponding to the PSS with root index r is given by $[0; P_r^{63}(32), \ldots P_r^{63}(62); O_{\overline{N}-63}^T, P_r^{63}(0), \ldots, P_r^{63}(30)]^T$ where 0k denotes the k×1 vector whose entries are all equal to 0. Note that PSS transmission is performed using 62 subcarriers in total; with 31 sub-carriers mapped on each side of the dc sub-carrier. In addition, $P_r^{63}(31)$ is not used to avoid modulating the dc subcarrier.

The SSS is transmitted on the same subcarriers used for PSS transmission. The SSS is constructed by interleaving, in the frequency domain, two length-31 BPSK-modulated sequences. The two sequences defining the SSS differ between subframe 0 and subframe 5 to enable the UE to identify the frame boundary. Each of the two frequency-domain SSS sequences is constructed by scrambling and cyclic shifting of a basic maximum length sequence (m-sequence). The scrambling codes are also constructed from cyclic-shifted m-sequences [24]. The scrambling codes and the cyclic shifts depend on the physical-layer identity, $N_{ID}^2$, as well as the physical-layer cell identity group, termed $N_{ID}^1$, which is an integer between 0 and 167. The physical-layer cell identity is defined as $$N_{ID} = 3N_{ID}^{(1)} + N_{ID}^{(2)} \quad (2)$$

and is an integer between 0 and 503.

The lth OFDM symbol is generated by performing an $\hat{N}$-point inverse discrete Fourier transform (IDFT) on the information symbols $\{x_l(k)\}_{k=0}^{\bar{N}-1}$ and inserting CP samples before the IDFT output. The OFDM symbol is transmitted over a carrier through the channel which is assumed to be block stationary, i.e., time-invariant during each OFDM symbol. At the UE, the received passband signal is down converted to baseband. Let $\Delta f$ denote the mismatch between the carrier frequency of the transmitter and the receiver. We can write the $\bar{N} \times 1$ received signal vector—after CP removal—corresponding to the transmission of the lth OFDM symbol as $$\bar{y}_l = \bar{E}_l \bar{F} H_l \bar{x}_l + \bar{n}_l \quad (3)$$

where $H_l = \text{diag}\{H_l(0), H_l(1), \ldots, H_l(\bar{N} \times 1)\}$ is a diagonal matrix containing the frequency response of the channel during the transmission of the lth OFDM symbol, $\bar{F}$ is the $\bar{N} \times \bar{N}$ IDFT matrix whose (n, k)th element is given by $$\frac{1}{\sqrt{N}} e^{j\frac{2\pi nk}{N}} \text{ for } n,$$

$k = 0, \ldots, \bar{N} - 1$, and the $\bar{N} \times \bar{N}$ diagonal matrix $\bar{E}_l$ is given by:

$$\bar{E}_l = e^{j\frac{2\pi \Delta f (l-1)(\bar{N}+\bar{N}g)}{f_s}} \text{diag}\left\{1, e^{j\frac{2\pi \Delta f}{f_s}}, \ldots, e^{j\frac{2\pi (\bar{N}-1)\Delta f}{f_s}}\right\} \quad (4)$$

where $\bar{N}g$ is the CP length. In (3), the $\bar{N} \times 1$ vector $\bar{n}_l$ contains the samples of the interference-plus-noise received with the lth OFDM symbol whose elements are independent of the transmitted information symbols.

Classical LTE synchronization algorithms start with PSS detection and decoding and proceed to SSS detection only after successful identification of the PSS sequence. Joint PSS detection and identification algorithms can operate on the received time-domain or frequency-domain samples. Time-domain algorithms search for the peak of the cross-correlation between the received samples and the three PSS signature sequences, e.g., [25][28]. Reduced complexity algorithms that decouple PSS detection and identification were also proposed. These algorithms exploit the central symmetry of the PSS or cross-correlate the received signal with the sum of the three PSS signature sequences [18], [29].

Frequency domain PSS detection and decoding algorithms consist of two stages. First, coarse synchronization is done to locate the boundaries of the OFDM symbols using the CP-based correlation method. Afterwards, PSS localization and identification can also be performed in the frequency-domain by computing the cross-correlation between the discrete Fourier transform (DFT) of the detected PSS vector and the ZC sequences [30]. The cross-correlation is computed using the 62 subcarriers corresponding to the active PSS subcarriers. However, in the presence of strong interference, the performance of CP-based correlation based methods severely deteriorates which renders frequency-domain PSS detection methods ineffective. In order to illustrate the effect of interference on CP-based correlation methods, the downlink of an FDD LTE system with 1.25 MHz BW and extended mode CP is simulated. We consider an interference signal occupying the band from 300 KHz to 390 KHz, i.e., the interference signal occupies approximately 10% of the bandwidth of the PSS signal. FIG. 2 shows the probability of detecting the boundary of the OFDM signal with an error less than 5 samples versus the signal-to-noise ratio in the absence and presence of interference. We can see from FIG. 2 that even when the ISR is as low as 0 dB, the performance of CP-based methods severely deteriorates compared to the case when the interference is absent.

After PSS detection and decoding, classical LTE synchronization algorithms proceed to SSS detection and decoding [24]. Since the CP and duplexing modes are still unknown, the receiver has to detect the location of the SSS sequence at all possible positions, e.g., via exploiting the conjugate symmetry of SSS waveform in the time-domain [29]. Afterwards, the receiver decodes the SSS either coherently or incoherently. In the case of coherent detection, the UE obtains the channel estimate from the detected PSS [31].

Adaptive Synchronization Algorithm

In this section, we present a novel synchronization algorithm for LTE systems with improved robustness against partial-band interference. The objective of the synchronization algorithm is to estimate the frame timing, CFO, physical-layer cell identity, CP length, and duplexing mode. This is accomplished by locating the PSS and SSS within the LTE downlink frame and decoding the information contained in them. The physical-layer identity and slot timing can be obtained from PSS processing while the physical-layer cell identity group, CP length, duplexing mode, and frame timing are obtained from SSS processing. After locating the PSS and SSS, the proposed algorithm estimates the CFO using the information contained in the received synchronization signals. The proposed algorithm can be divided into the following three parts; PSS detection and processing, SSS detection and processing, and CFO estimation.

A. PSS Detection and Processing

Figure 3B:
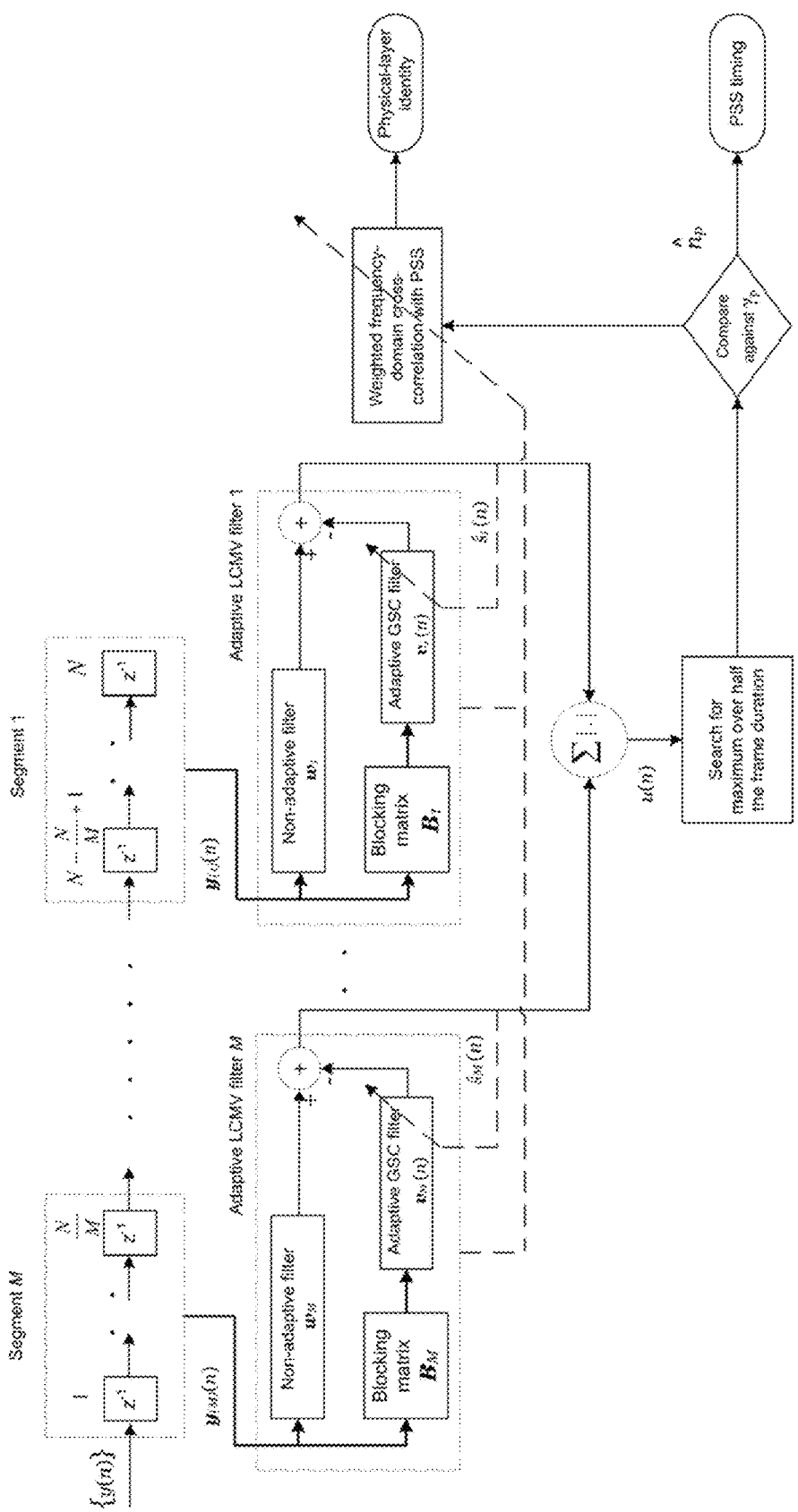
FIG. 3B is a block diagram of another embodiment of the invention with the proposed adaptive detection algorithm.

FIG. 3 shows a block diagram of the proposed PSS processing algorithm. The algorithm receives a time-domain low-pass filtered baseband signal of BW 480 KHz sampled at $f_s \geq 960$ KHz. Since the duration of one OFDM symbol—without the CP—is given by T=66:67 μs, the number of samples corresponding to one OFDM symbol is given by $N = f_s T$, i.e., at $f_s = 960$ KHz, N=64. Recall that the synchronization signals are located on the 62 central subcarriers around the dc subcarrier, and hence, the low-pass filtered input samples contain all the transmitted information in the LTE downlink synchronization signals. It is worth mentioning that increasing the sampling rate beyond 960 KHz provides an oversampling gain at the cost of increasing the computational complexity of the proposed algorithm [32].

The PSS processing algorithm can be divided into two main stages. In the first one, M parallel adaptive LCMV filters are used to suppress the output corresponding to the received signal vectors that do not correspond to PSS transmission. The algorithm utilizes the outputs of these adaptive filters to detect the location of the PSS signal within the received LTE downlink signal. In the second stage, the physical-layer identity is estimated by finding the ZC sequence that has the highest "weighted" cross-correlation with the detected PSS sequence in the frequency-domain.

1) Adaptive filtering and PSS localization: Let y(n) denote the nth sample of the input time-domain low-pass filtered signal. Furthermore, let y(n)=[y(n), . . . , y(n+N−1)]T represent the N×1 vector containing the latest N samples of {y(n)} at time instant n+N−1. The vector y(n) is divided into M segments, $\{y_{(m)}(n)\}_{m=1}^{M}$, each of length $$\frac{N}{M}$$

where $$y_{(m)}(n) = \left[y\left(n + (m-1)\frac{N}{M}\right), \ldots, y\left(n + \frac{mN}{M} - 1\right)\right]^T. \quad (5)$$

The mth segment of the vector y(n) is linearly processed by the adaptive filter, $g_{(m)}(n)$, to produce the filtered output $s_{(m)}(n)$ which is given by $$s_{(m)}(n) = g_{(m)}^H(n) y_{(m)}(n) \quad (6)$$

where $(\blacksquare)^H$ denotes the Hermitian transpose operator and $g_{(m)}(n) = [g_{(m)}; 0(n), \ldots, g_{(m)};$ $$\frac{N}{M} - 1(n)\bigg]^T$$

is the $$\frac{N}{M} \times 1$$

vector containing the coefficients of the adaptive filter at the nth time instant.

We design the coefficients of the adaptive filters using the LCMV design criterion, i.e., we minimize the output power of each filter while preserving the outputs corresponding to the transmission of any of the three possible PSS signatures. Let the N×1 vector $c_i$ represent the input received signal vector corresponding to transmission of the PSS with $N_{ID}^2=i$, where i=0, 1, and 2. Furthermore, let $c_{(m),i}$ denote the mth segment of the vector ci. Therefore, the vector $g_{(m)}(n)$ can be obtained by solving the following optimization problem $$\min_{g_{(m)}(n)} g_{(m)}^H(n) R_{(m)}(n) g_{(m)}(n) \mid \quad (7)$$

$$\text{subject to} \quad g_{(m)}^H(n) c_{(m),i} = \frac{1}{M} \text{ for } i = 0, 1, 2$$

where $R_{(m)}(n)=E\{y_{(m)}(n)y_{(m)}^H(n)\}$ is the covariance matrix of $y_{(m)}(n)$, and $E\{\blacksquare\}$ denotes the statistical expectation.

The above LCMV optimization problem can be converted to an equivalent unconstrained optimization problem by using the GSC decomposition of the adaptive filter coefficients [33]. In particular, let us define the $$\frac{N}{M} \times 3$$

matrix $C_{(m)}$ whose columns contain the mth segment of all possible three PSS signatures, i.e., $C_{(m)}=[c_{(m),0}, c_{(m),1}, c_{(m),2}]$. Let $B_{(m)}$ denote the $$\frac{N}{M} \times \left(\frac{N}{M} - 3\right)$$

matrix whose columns span the nullspace of $C_{(m)}^H$, i.e., $$B_{(m)}^H c_{(m),i} = O_{\frac{N}{M}-3}$$

for i=0, 1, and 2. Using the matrix $B_{(m)}$, we can decompose the vector $g_{(m)}(n)$ into $$g_{(m)}(n) = w_{(m)} - B_{(m)} v_{(m)}(n) \quad (8)$$

where $$w_{(m)} = \frac{1}{M} C_{(m)} (C_{(m)}^H C_{(m)})^{-1} 1_3 \quad (9)$$

is a fixed weight vector, i.e., independent of n, $1_k$ is the k×1 vector whose entries are all equal to 1, and the $$\left(\frac{N}{M} - 3\right) \times 1$$

vector $v_{(m)}(n)$ contains the adaptive GSC filter coefficients at time instant n. By substituting with (8) in (7), we can convert the LCMV problem into the following unconstrained optimization problem $$\min_{v_{(m)}(n)} (w_{(m)} - B_{(m)} v_{(m)}(n))^H R_{(m)}(n) (w_{(m)} - B_{(m)} v_{(m)}(n)) \quad (10)$$

where the adaptive GSC weight vector that yields the optimal solution of (10) is given by $$v_{(m)}^*(n) = (B_{(m)}^H R_{(m)}(n) B_{(m)})^{-1} B_{(m)}^H R_{(m)}(n) w_{(m)}. \quad (11)$$

Since the covariance matrix R(m)(n) is not readily available at the receiver, we employ the RLS algorithm to estimate the adaptive GSC weight vector iteratively from the received signal samples. The RLS algorithm is initialized by setting the initial weight vector estimate as $$\hat{v}_{(m)}(0) = 0_{\frac{N}{M}-3}$$

and its associated covariance matrix as $$P_{(m)}(0) = \delta I_{\frac{N}{M}-3}$$

where $I_k$ denotes the k×k identity matrix and δ is a large number, e.g., δ=10. Given the estimate of the filter coefficients at time instant n−1, $\hat{v}_{(m)}(n-1)$, and its associated covariance $P_{(m)}(n-1)$, the RLS algorithm computes the gain vector $k_{(m)}(n)$ as $$k_{(m)}(n) = \frac{P_{(m)}(n-1)B_{(m)}^H y_{(m)}(n)}{\lambda + y_{(m)}^H(n)B_{(m)}P_{(m)}(n-1)B_{(m)}^H y_{(m)}(n)}. \quad (12)$$

where $\lambda$ is the RLS forgetting factor that gives exponentially less weight to older samples. The filter coefficients and the associated covariance are updated respectively by $$\hat{v}_{(m)}(n) = \hat{v}_{(m)}(n-1) + k_{(m)}(n)\hat{s}_{(m)}^*(n) \quad (13)$$

$$P_{(m)}(n) = \frac{1}{\lambda}(P_{(m)}(n-1) - k_{(m)}(n)y_{(m)}^H(n)B_{(m)}P_{(m)}(n-1)) \quad (14)$$

where $(\blacksquare)^*$ denotes the complex conjugate operator and $\hat{s}_{(m)}(n)$ is the output of the mth LCMV filter at the nth time instant computed using the estimate of the optimal GSC filter coefficients at time instant n−1, i.e., $$\hat{s}_{(m)}(n) = w_{(m)}^H y_{(m)}(n) - \hat{v}_{(m)}^H(n-1)B_{(m)}^H y_{(m)}(n). \quad (15)$$

Note that $\hat{s}_{(m)}(n)$ is an estimate of the ideal filter output $s_{(m)}(n)$ in (6) as it is calculated using the weight vector estimate at time n−1 instead of the optimum weight vector at time n.

The outputs of the M filters are combined to yield the PSS-detection metric u(n) which is given by $$u(n) = \sum_{m=1}^{M} |\hat{s}_{(m)}(n)| \quad (16)$$

where $|\blacksquare|$ denotes the magnitude of a complex number. Due to utilizing the LCMV design criterion, each LCMV filter will suppress its output except when the input corresponds to one of the three possible PSS signatures. As a result, the metric u(n) can be utilized to search for the location of the PSS signal within the downlink frame. The PSS detection algorithm locates the PSS by searching for the sample index that corresponds to the maximum value of u(n) over half the frame duration, i.e., the search is performed over $5 \times 10^{-3} f_s$ samples. Let $\hat{n}p$ denote the samples index corresponding to the maximum value of u(n) over the search window. The proposed algorithm declares detection of the PSS signal at $n=\hat{n}p$ if $$|u(\hat{n}p)| \geq \gamma_p \quad (17)$$

where $\gamma_p$ is a predetermined threshold that can be used to control the probabilities of detection and false alarm.

Therefore, increasing the number of segments improves the robustness of the algorithm towards CFO mismatches. A detailed analysis of the effect of the number of segments on the PSS detection metric is presented in the Appendix.

2) Physical-layer identity estimation: Since the LCMV filtering algorithm is designed to have the same output for all possible PSS signatures, the physical-layer identity cannot be directly determined from the metric u(n). Note that due to utilizing the LCMV design criteria, the adaptive filters minimize the output resulting from the contribution of the interference signal at the PSS detection instant. As a result, the frequency response of the filters at the detection instant provides information about the power spectral density of the interference signal. Let $Y_P = [Y_P(0), \ldots, Y_P(N-1)]^T$ denote the N-point DFT of the received vector $y(\hat{n}p)$ at the PSS-detection instant. Also, let the N×1 vector g denote the concatenation of the adaptive LCMV filters corresponding to the M segments at the PSS detection instant, i.e., $$g = [w_{(1)}^T - \hat{v}_{(1)}^T(\hat{n}p)B_{(1)}^T, \ldots, w_{(M)}^T - \hat{v}_{(M)}^T(\hat{n}p)B_{(M)}^T]^T. \quad (18)$$

Furthermore, let $G = [G(0), \ldots, G(N-1)]^T$ represent the N-point DFT of $g^*$. Therefore, the frequency response of the concatenated LCMV filter at the detection instant can be used to suppress the interference signal. The received PSS symbol on the kth subcarrier after interference suppression is computed as $$V(k) = Y_P(k)G(-k). \quad (19)$$

The physical-layer identity can be estimated by computing the cross-correlation in the frequency domain between the interference-free received signal and the three PSS signature vectors. However, the PSS signature vectors ci should be modified to account for the effect of the interference suppression operation in (19). Let $c_{i,l}$ represent the lth component of the signature vector ci of the PSS transmission corresponding to physical-layer identity i, i.e., $c_i = [c_{i,0}, \ldots, c_{i,N-1}]^T$. Let $C_i = [C_i(0), \ldots, C_i(N-1)]^T$ denote the N-point DFT of $c_i$. The filtered frequency-domain signature sequence of the PSS transmission corresponding to physical-layer identity i is computed as $$\hat{C}_i(k) = C_i(k)G(-k). \quad (20)$$

Using (19) and (20), the physical-layer identity is estimated as $$\hat{N}_{ID}^{(2)} = \underset{i=0,1,2}{\operatorname{argmax}} \left| \sum_{k=0}^{N-1} V*(k)\overline{C}_i(k) \right| \quad (21)$$

$$= \underset{i=0,1,2}{\operatorname{argmax}} \left| \sum_{k=0}^{N-1} |G(-k)|^2 Y_P^*(k) C_i(k) \right| \quad (22)$$

The expression in (22) is a weighted frequency-domain crosscorrelation of the detected PSS signal with candidate PSS sequences. The weighting is done using the squared magnitude response of the concatenated LCMV filter at the detection instant in order to eliminate the contribution of the interference signal to the computed cross-correlation metric in (22).

B. SSS Detection and Processing

After detecting the physical-layer identity, the CP type and the duplexing mode can be detected together with the physical-layer cell identity group. The detection is performed via weighted frequency-domain cross-correlation of all possible 168 SSS signature waveforms with the received signal at the 4 candidate locations of the SSS sequence. We assume that the power spectral density of the interference signal does not change significantly over the temporal duration between SSS and PSS transmission. Hence, the cross-correlation weighting is done using the frequency response of the LCMV filter at the detection instant of the PSS.

Given the sampling rate of the algorithm, $f_s$, and the PSS timing, $\hat{n}p$, there are 4 possible locations of the SSS which are given by
1) $n_S, 1 = \hat{n}p - N - T_N f_s$: for FDD with normal CP mode
2) $n_S, 2 = \hat{n}p - N - T_E f_s$: for FDD with extended CP mode
3) $n_S, 3 = \hat{n}p - 3N - 3T_N f_s$: for TDD with normal CP mode
4) $n_S, 4 = \hat{n}p - 3N - 3T_E f_s$: for TDD with extended CP mode
where $T_N = 4:69 \times 10^{-6}$ and $T_E = 16:67 \times 10^{-6}$ are the durations of the CP of one OFDM symbol in the normal CP and extended CP modes, respectively. Let the N×1 vector $y_{n_{S,i}} = [y(n_{S,i}), y(n_{S,i}+1) \ldots , y(n_{S,i}+N-1)]^T$ where i=1, . . . , 4 represent the ith candidate received SSS vector. Furthermore, let $s_j = [s_{j,0}, \ldots s_{j,N-1}]^T$ denote the SSS signature vector corresponding to physical-layer cell identity group $N_{ID}^{(1)} = 1$ associated with the estimated physical-layer identity $\hat{N}_{ID}^{(2)}$. Similar to physical-layer identity estimation algorithm in Subsection III-A2, the location of the SSS and the physical-layer cell identity group can be jointly estimated via weighted frequency-domain cross correlation as $$\{\hat{N}_{ID}^{(1)}, \hat{n}_S\} = _{j=0,\ldots,167, i=1,\ldots,4}^{argmax} |\Sigma_{k=0}^{N-1}|G(k)|^2 Y_{S,i}^*(k) S_j(k)| \qquad (23)$$

where $Y_{S,i}(k)$ and $S_j(k)$ are given respectively by $$Y_{S,i}(k) = \frac{1}{\sqrt{N}} \sum_{n=0}^{N-1} y(n_{S,i}+n) e^{-j\frac{2\pi nk}{N}}, \qquad (24)$$

$$S_k(k) = \frac{1}{\sqrt{N}} \sum_{n=0}^{N-1} S_{j,n} e^{-j\frac{2\pi nk}{N}}, \qquad (25)$$

Note that we have utilized the frequency response of the adaptive LCMV filter at the PSS detection instant to suppress the contribution of the interference signal to the cross-correlation metric in (23). Since $S_j(k) \in \{0, 1, -1\}$ for all k, j, the number of multiplications required to compute the cross correlation metrics in (23) is only 8N real-valued multiplications.

C. Carrier Frequency Offset Estimation

After locating and decoding the received PSS and SSS, the CFO can be estimated by joint processing of the DFT of the received PSS and SSS in the frequency domain. The proposed algorithm exploits the CFO-induced phase shift between the samples of the received PSS and the SSS to estimate the CFO [34]. The magnitude response of the adaptive LCMV filter at the detection instant is also utilized to reduce the effect of the interference signal on the CFO estimate. We can write the DFT of the lth received time-domain OFDM symbol—given by (3)—at the kth subcarrier as [34]

$$\overline{Y}_l(k) = e^{j\frac{\pi \Delta f(\overline{N}-1)}{f_s} + \theta_l} \frac{\sin\left(\frac{\pi \hat{N} \Delta f}{\Box}\right)}{\overline{N} \sin\left(\frac{\pi \Delta f}{f_s}\right)} H_l(k) x_l(k) + \overline{I}_{l,k} + \overline{N}_{l,k} \qquad (26)$$

where $$\theta_l = \frac{2\pi \Delta f(l-1)(\overline{N}+\overline{N}_g)}{f_s} \qquad (27)$$

is the component of the CFO-induced phase shift that depends on the location of the OFDM symbol within the downlink frame. The first term in (26) is the transmitted information symbol on the kth subcarrier multiplied by the corresponding frequency response of the channel. This component experiences an amplitude reduction and phase shift due to CFO. The second term in (26) is the inter-carrier interference caused by CFO while the third term is the interference-plus-noise at the kth subcarrier.

The proposed CFO estimation algorithm exploits the phase shift induced by CFO that depends on the location of the OFDM symbol in the frame, and the frame timing information obtained from PSS and SSS detection, i.e., the difference between $\hat{n}_P$ and $\hat{n}_S$. We utilize the frequency response of the adaptive LCMV filter at the PSS detection instant to reduce the effect of the interference signal on the CFO estimation metric. The CFO estimation metric $\hat{\theta}$ is computed as $$\hat{\theta} = \angle \{\Sigma_{k=0}^{N-1} |G(-k)|^2 Y_P(k) C_{\hat{N}_{ID}^{(2)}}^*(k) (|G(-k)|^2 Y_S(k) S_{\hat{N}_{ID}^{(1)}}^*(k))^* \} \qquad (28)$$

where $\angle \{z\}$ denotes the phase of the complex number z and $Y_S(k)$ is the DFT of the detected SSS sequence at the kth subcarrier. Assuming that the frequency response of the channel is constant over the temporal window spanning the duration of PSS and SSS transmission, and neglecting the inter-carrier interference and the interference-plus-noise terms in (26), we can estimate the CFO as $$\Delta \hat{f} = \frac{f_s \hat{\theta}}{2\pi(\hat{n}_P - \hat{n}_S)}. \qquad (29)$$

Note that the proposed CFO estimation algorithm has a limited range of detection that depends on the temporal separation between the PSS and SSS. In particular, the maximum CFO value that can be detected is given by ±7 KHz in the case of FDD with normal CP, and ±2 KHz in the case of TDD with extended CP mode3.

IV. Numerical Simulations

In this section, the performance of the proposed adaptive synchronization algorithm is evaluated using numerical simulations. The downlink of an FDD LTE system with 1.25 MHz BW and normal mode CP is simulated. The sampling frequency for the adaptive algorithm is set to $f_s$=960 KHz resulting in a processing window of length N=64 samples. Simulation results are obtained by averaging over 400 Monte Carlo runs. In each run, the cell identity is generated randomly. The synchronization algorithm is considered successful if the detected cell identity, CP mode, and duplexing mode match the true values of the system as well as the estimate of the frame start index is within the length of the CP of the first OFDM symbol. A false alarm event is declared when any of the above conditions is violated given that the threshold $\gamma_p$=0:3 is crossed during PSS search. The parameters of the adaptive GSC filter are selected as γ=0:98 for M=1 and λ=0:95 for M=2 while the RLS covariance initialization parameter δ was selected as δ=10.

Figure 4:
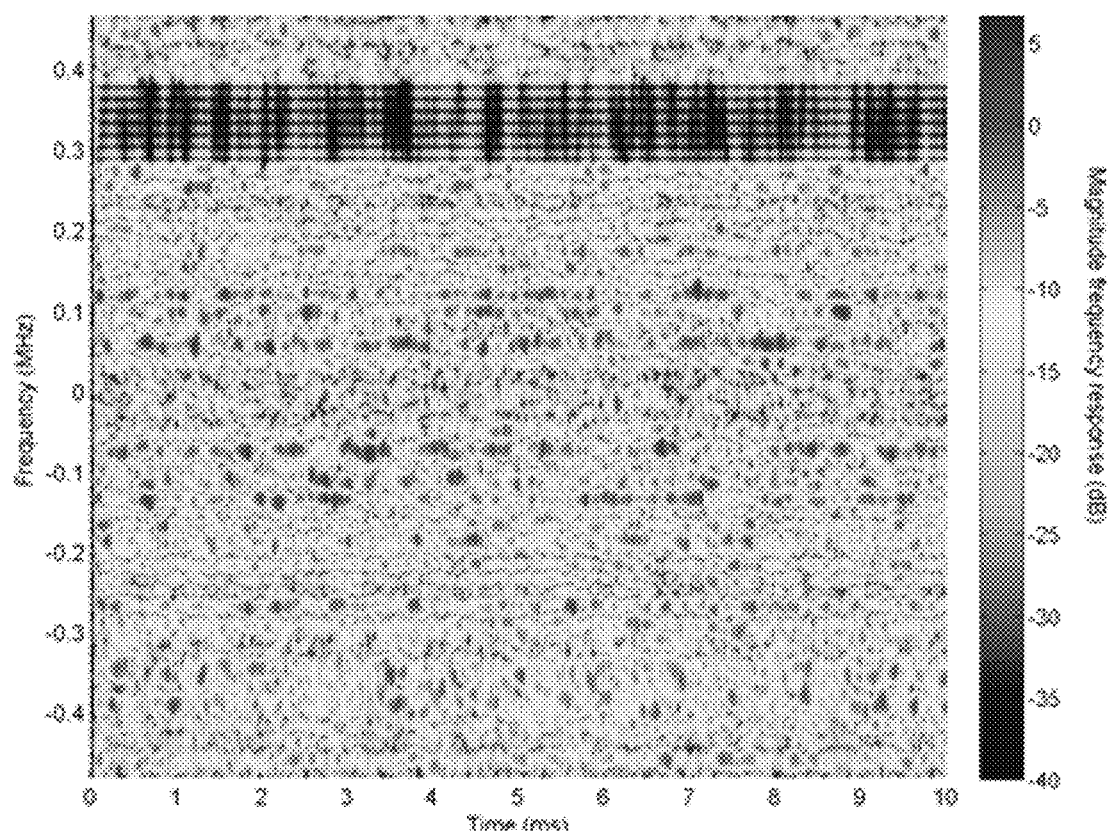
FIG. 4 shows the frequency response of the adaptive LCMV filter over the duration of one LTE frame (partial band interference scenario).
Figure 5:
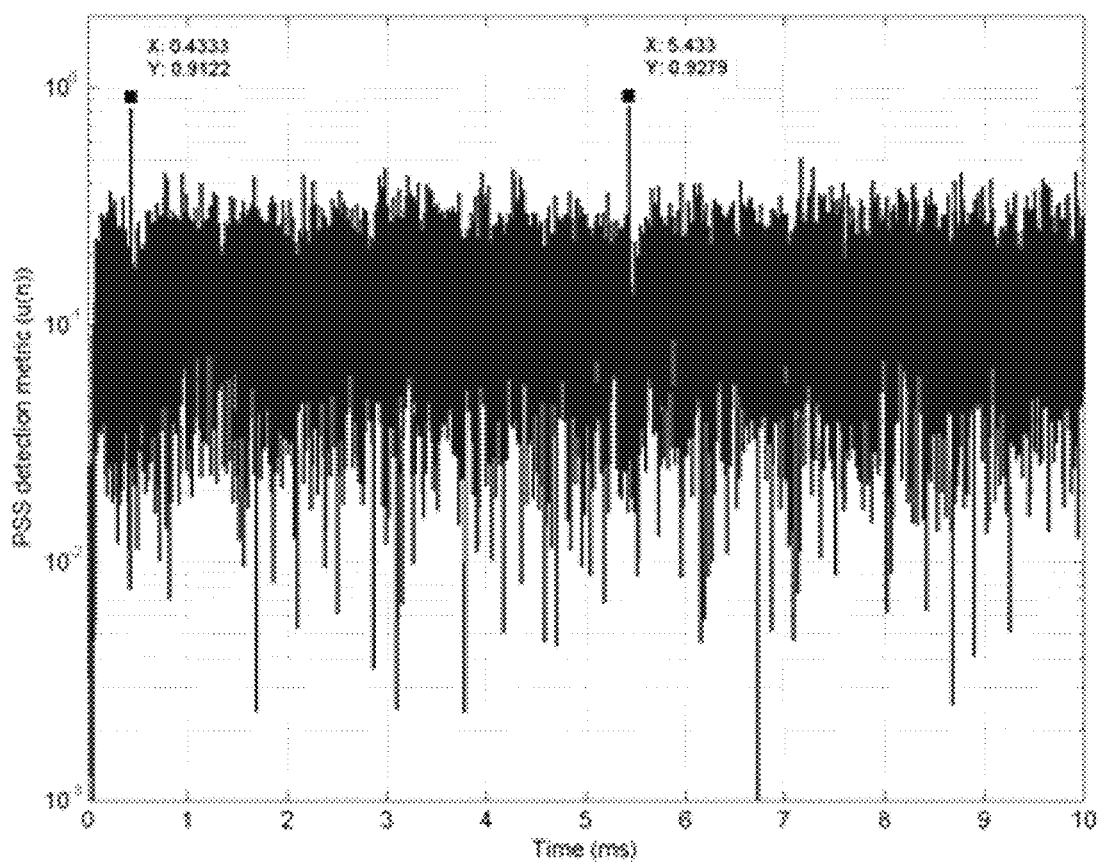
FIG. 5 shows the magnitude of the adaptive LCMV filter output versus time.

Similar to [36][39], we consider an interference signal composed of a superposition of modulated sinusoids. Unless stated otherwise, the interference signal is generated as a collection of seven single tones with 15 KHz spacing occupying the band from 300 KHz to 390 KHz. The interference signal is held active over the entire frame duration. In order to focus on illustrating the performance of the PSS detection algorithm, first, a frequency-nonselective channel is considered. The ISR is set to 20 dB. FIG. 4 shows the magnitude response of the proposed adaptive LCMV filtering algorithm with M=1 over the temporal duration of one LTE frame. We can see from this figure that the LCMV filter places deep nulls at the frequencies of the interference signal over the whole temporal duration of the interference signal. As a result, the interference signal is effectively blocked from the output of the adaptive filter. FIG. 5 shows the PSS detection metric, u(n), versus time over the duration of one frame. It can be seen from this figure that the metric has two peaks that are spaced 5 ms apart corresponding to the locations of the PSS within one LTE frame. FIG. 5 also shows that the adaptive filter can effectively remove the contribution of the interference signal where the peak-to-side-peak ratio is around 2.

Figure 6:
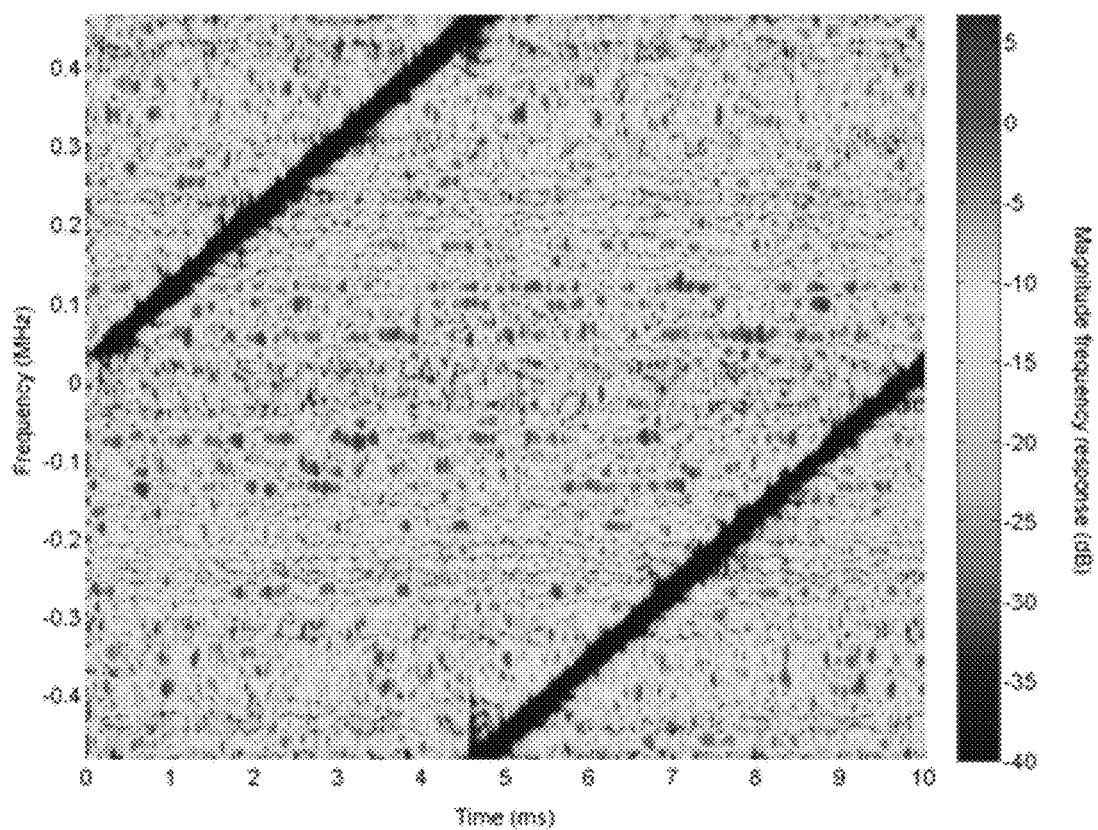
FIG. 6 shows the frequency response of the adaptive LCMV filter over the duration of one LTE frame.

In order to illustrate the ability of the proposed synchronization algorithm to rapidly adapt to the jamming signal, we consider a jamming signal whose frequency chirps linearly from −480 KHz to 480 KHz in a time interval of duration 10 ms. The jamming signal is present over the entire frame duration and the jamming-to-signal (JSR) ratio is set to 20 dB. The parameters of the algorithm are selected as $M=1$, $\lambda=0.98$, and $\delta=10$. In order to focus on illustrating the performance of the PSS detection algorithm, we also consider a frequency-nonselective channel. FIG. 6 shows the magnitude response of the adaptive LCMV filter over the temporal duration of one LTE frame. We can see from this figure that the proposed algorithm can effectively track the jamming signal by placing deep nulls at its spectral components. The PSS detection metric also showed two clear peaks that are spaced 5 ms apart similar to those observed in FIG. 5.

Next, we compare the performance of the proposed algorithm to that of a classical non-robust LTE synchronization algorithm that employs time-domain cross-correlation with the stored PSS signature waveforms to detect the PSS location and estimate the physical-layer identity. The non-robust synchronization algorithm then searches for the SSS and decodes it by using time-domain cross-correlation with all possible SSS signature waveforms. The non-robust synchronization algorithm is implemented at a sampling frequency equal to 1.92 MHz which corresponds to the system BW, i.e., twice the sampling frequency of the proposed adaptive algorithm.

Figure 7:
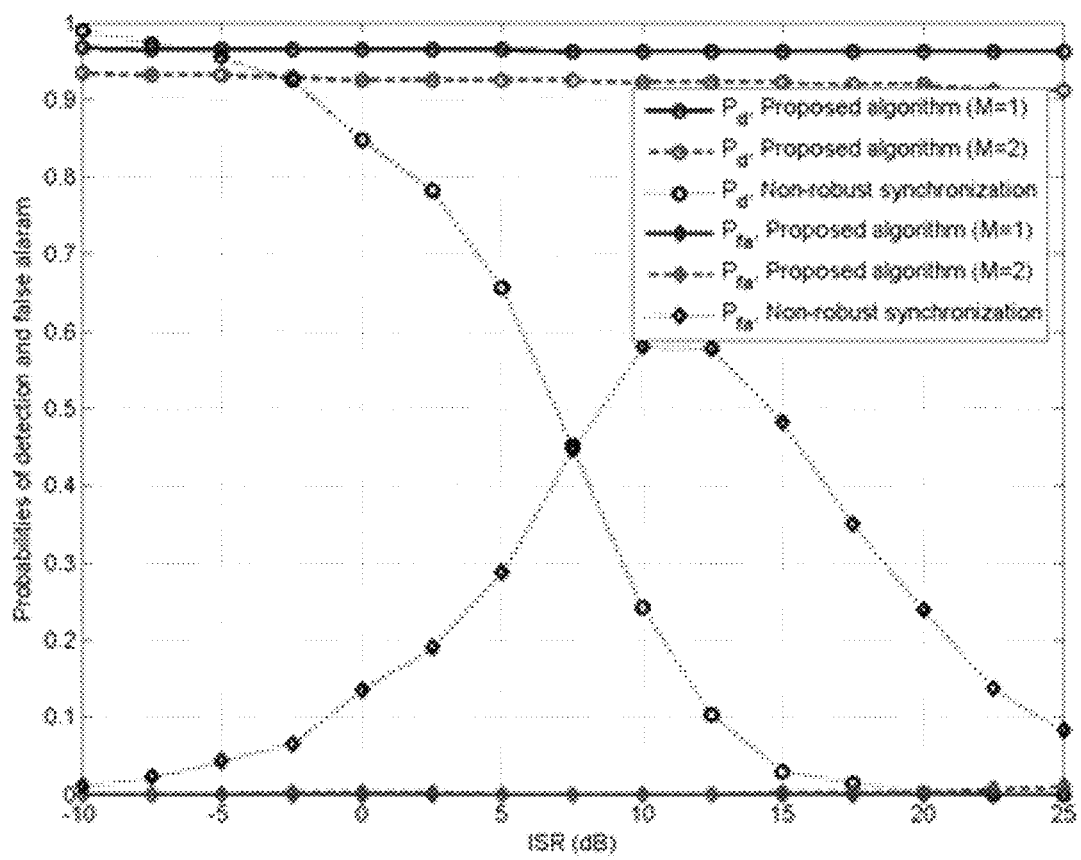
FIG. 7 shows probabilities of detection and false alarm versus ISR.

FIG. 7 shows the probabilities of detection and false alarm versus ISR for the Extended Pedestrian A channel model with 5 Hz Doppler (EPA5). As seen from this figure, the proposed algorithm maintains a high probability of detection and a probability of false alarm almost equal to zero for all tested ISR values. In contrast, the performance of the non-robust synchronization algorithm starts to deteriorate when the ISR increases above 0 dB. The constraints in the proposed LCMV adaptive filtering algorithm ensure a distortion-less response to the received PSS signal while effectively removing the interference signal. We can also notice that increasing the number of segments from $M=1$ to $M=2$ slightly reduces the probability of detection due to decreasing the interference cancellation capability of the algorithm.

Figure 8:
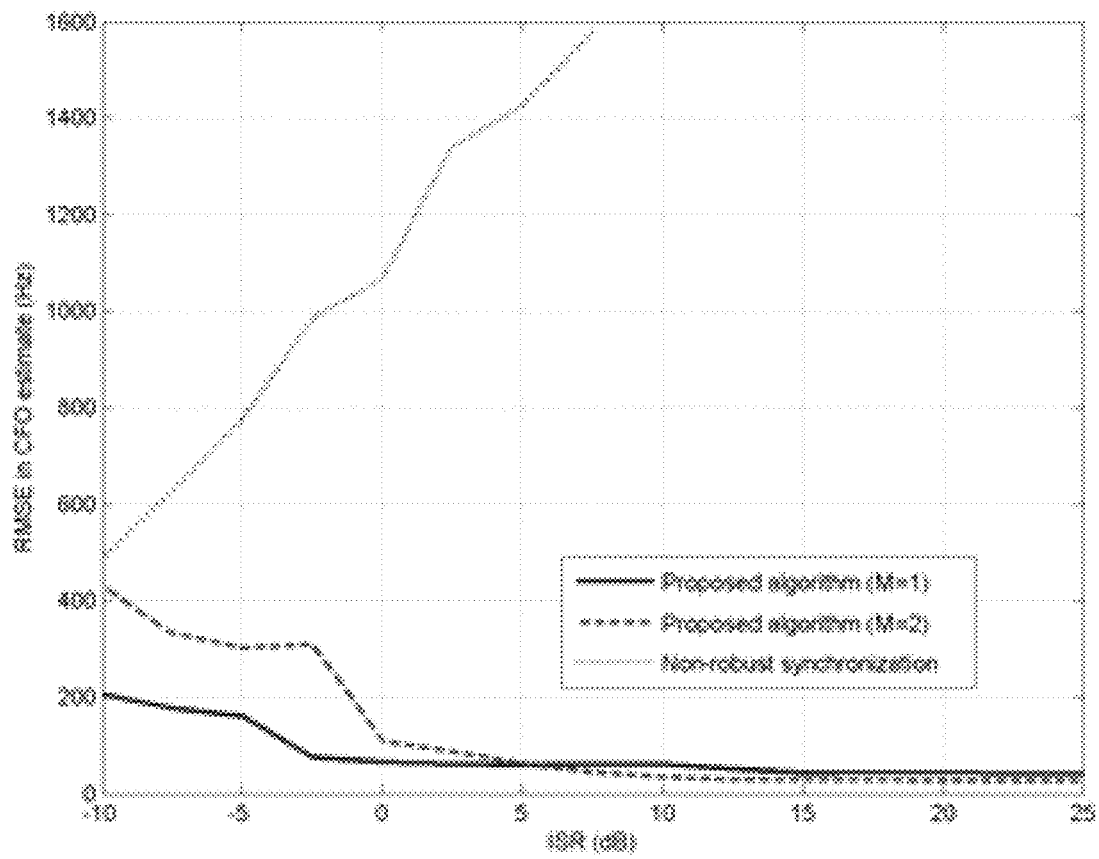
FIG. 8 shows RMSE in CFO estimate versus ISR.

FIG. 8 shows the root mean square error (RMSE) in CFO estimate versus ISR for different algorithms. The RMSE is computed only when the probability of detection is higher than 0.25 by averaging only over the runs in which correct detection occurred. As seen from this figure, the accuracy of the CFO estimates produced by the non-robust algorithm deteriorate rapidly as the ISR increases. In contrast, the proposed algorithm can produce a very accurate estimate of the CFO. In fact the accuracy of the CFO estimate of the proposed algorithm is better at high ISR than at low and intermediate values. This can be attributed to the fact that at high ISR, the LCMV filter places deep nulls at the interference frequencies which effectively eliminates the contribution of the interference signal to the CFO estimation metric in (28).

Figure 9:
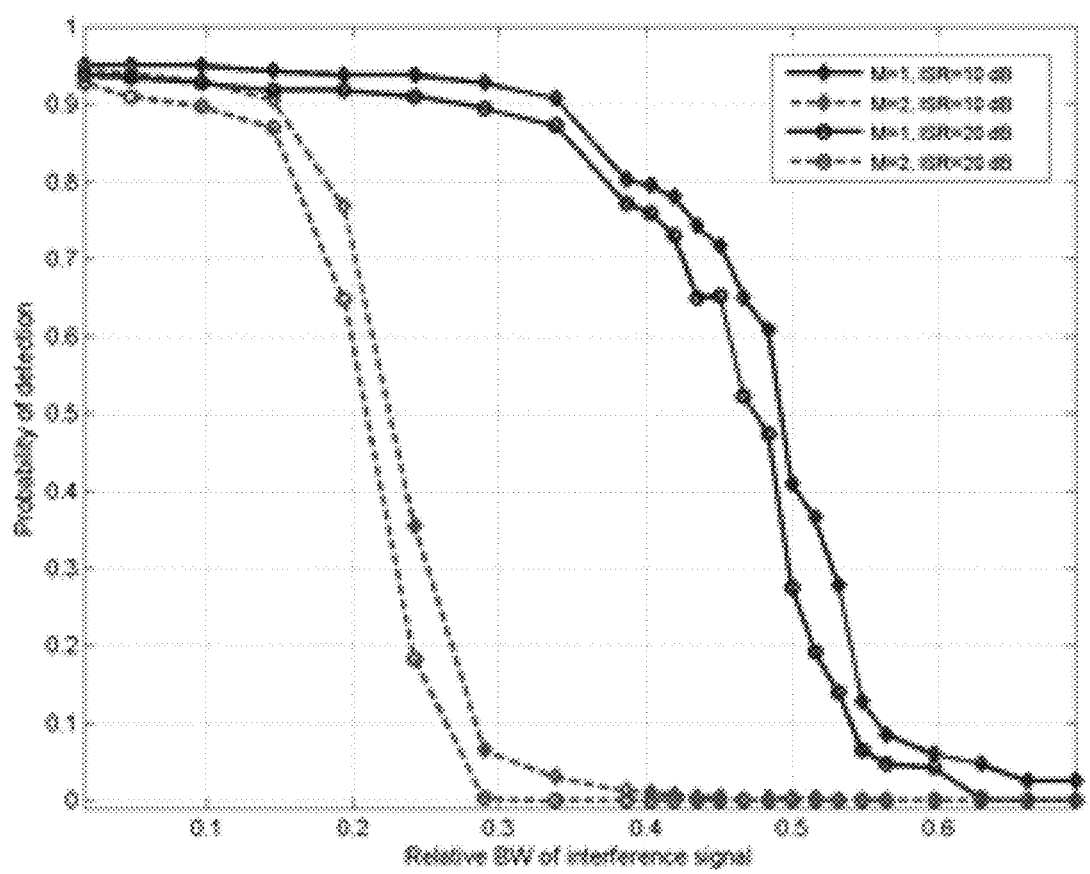
FIG. 9 shows the probability of detection versus the relative BW of the interference signal.
Figure 10:
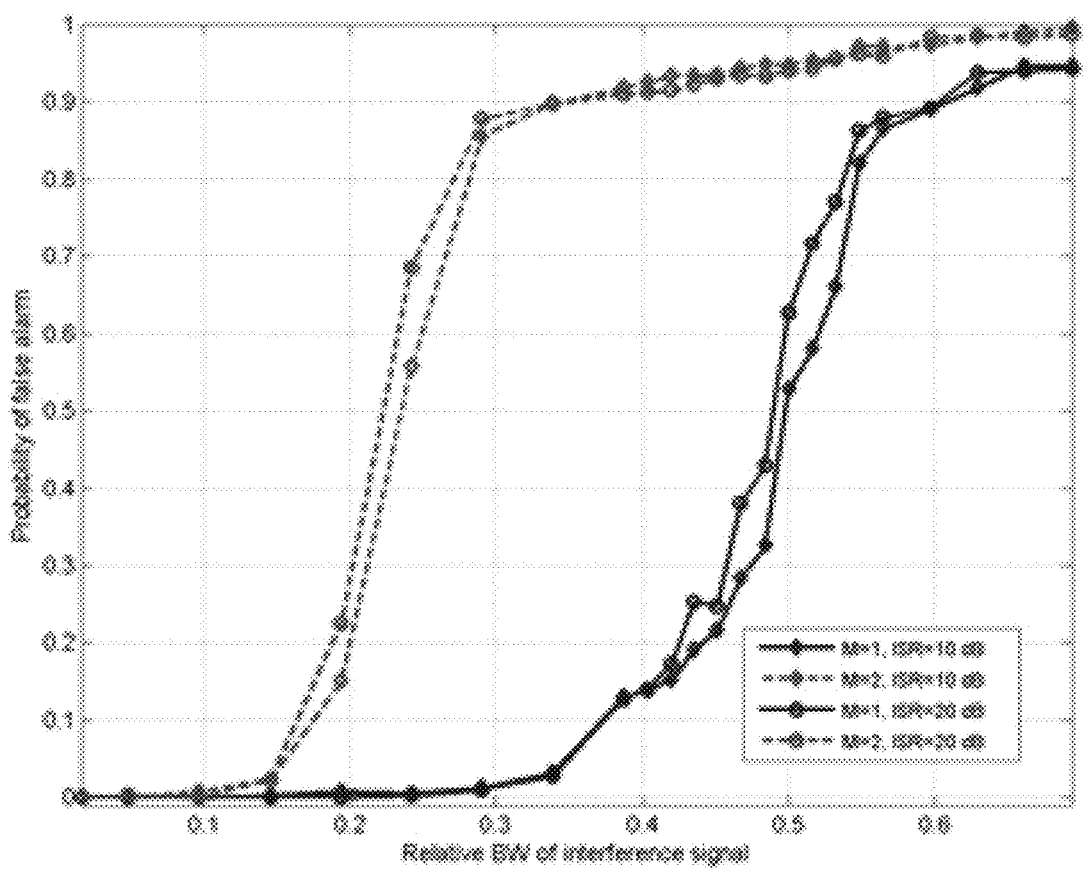
FIG. 10: Probability of false alarm versus the relative BW of the interference signal.

In order to investigate the effect of the interference signal BW on the performance of the proposed algorithm, interference signals of various BW are created as sums of single tones with 15 KHz spacing starting from $f_{min}$ to $f_{max}=390$ KHz. We define the relative BW of the interference signal as $$BW_r \triangleq \frac{f_{max} - f_{min}}{62 \times 15 \times 10^3} \qquad (30)$$

which represents the fraction of PSS and SSS subcarriers affected by interference. FIG. 9 and FIG. 10 show the probabilities of detection and false alarm versus the relative BW of the interference signal at two ISR values. We can see from these figures that the proposed synchronization algorithm with $M=1$ can effectively combat the interference signal even when it covers one third of the BW of the synchronization signals. When the interference power is distributed over more than one third of the BW, the proposed synchronization algorithm cannot effectively cancel the interference signal while preserving the information contained in the PSS. We can also notice from FIG. 9 and FIG. 10 that increasing the number of segments from $M=1$ to $M=2$ reduces the interference suppression capability of the proposed algorithm by a factor of two. This can be attributed to the reduced length of the adaptive filters when $M=2$ that reduces the available degrees of freedom required to place nulls at the frequencies of the interference signal.

Figure 11:
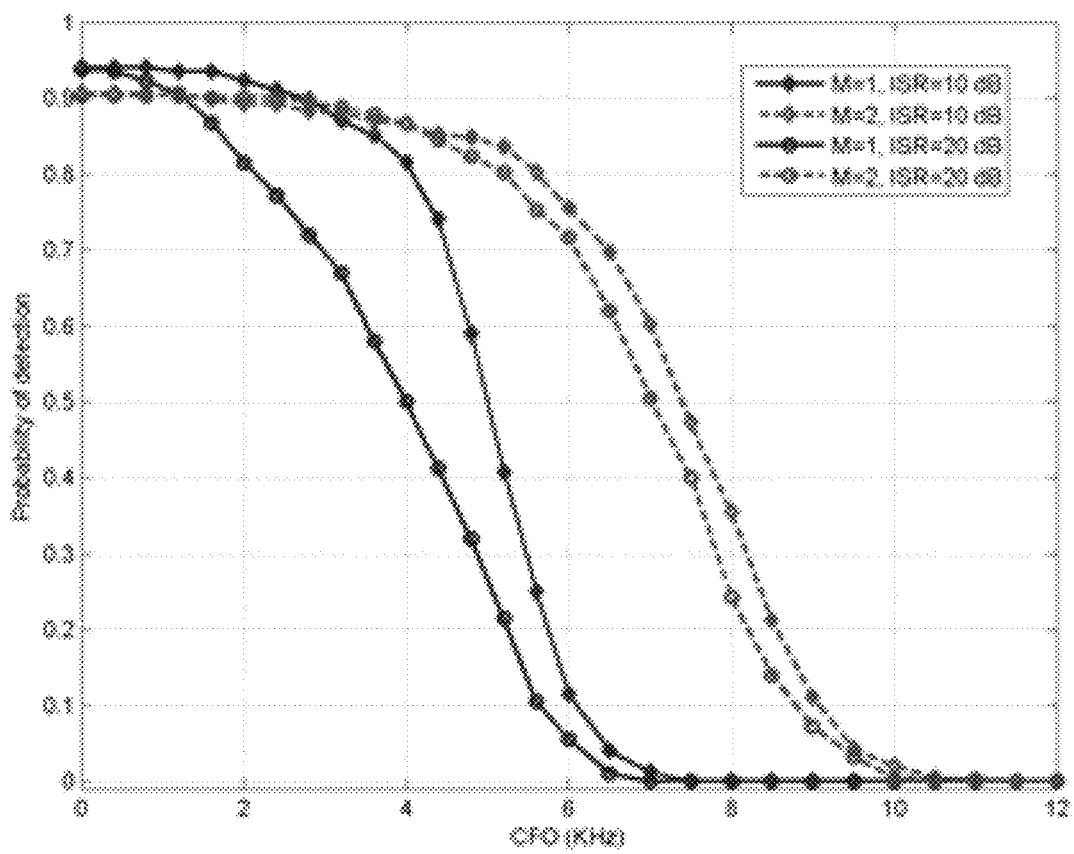
FIG. 11: Probability of detection versus CFO.
Figure 12:
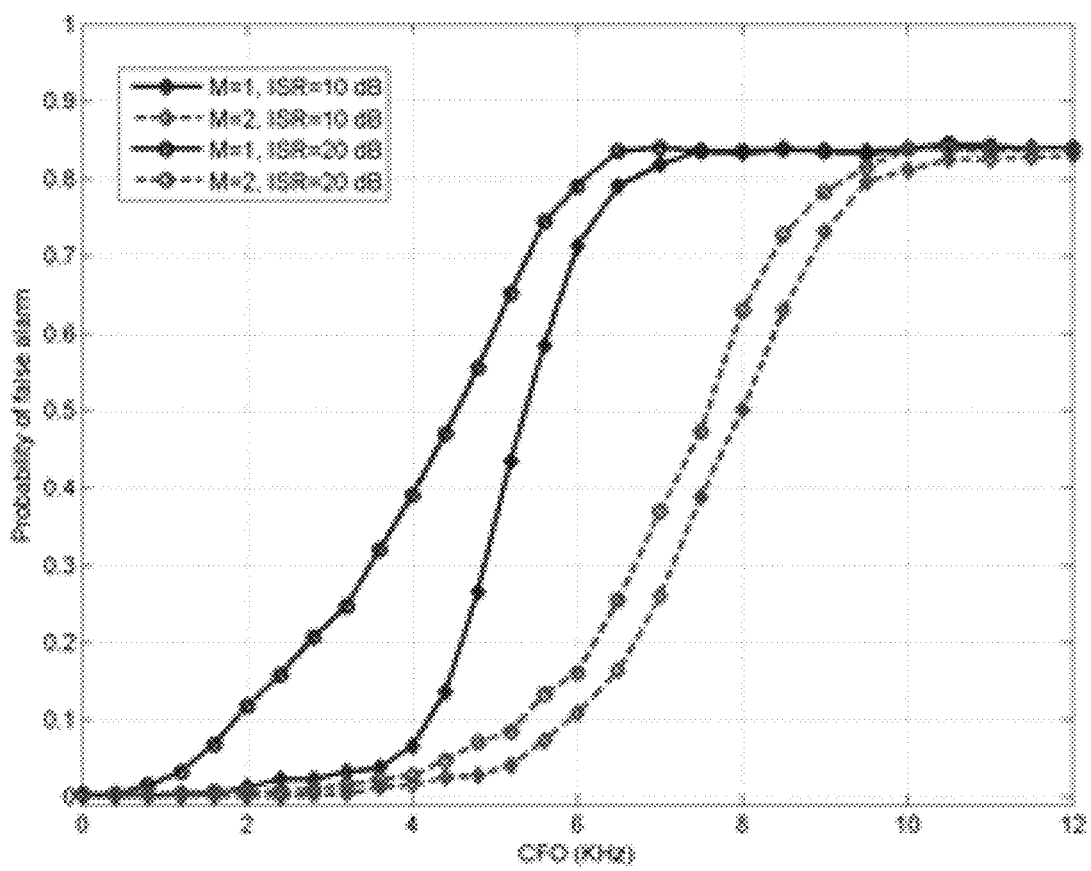
FIG. 12: Probability of false alarm versus CFO.
Figure 13:
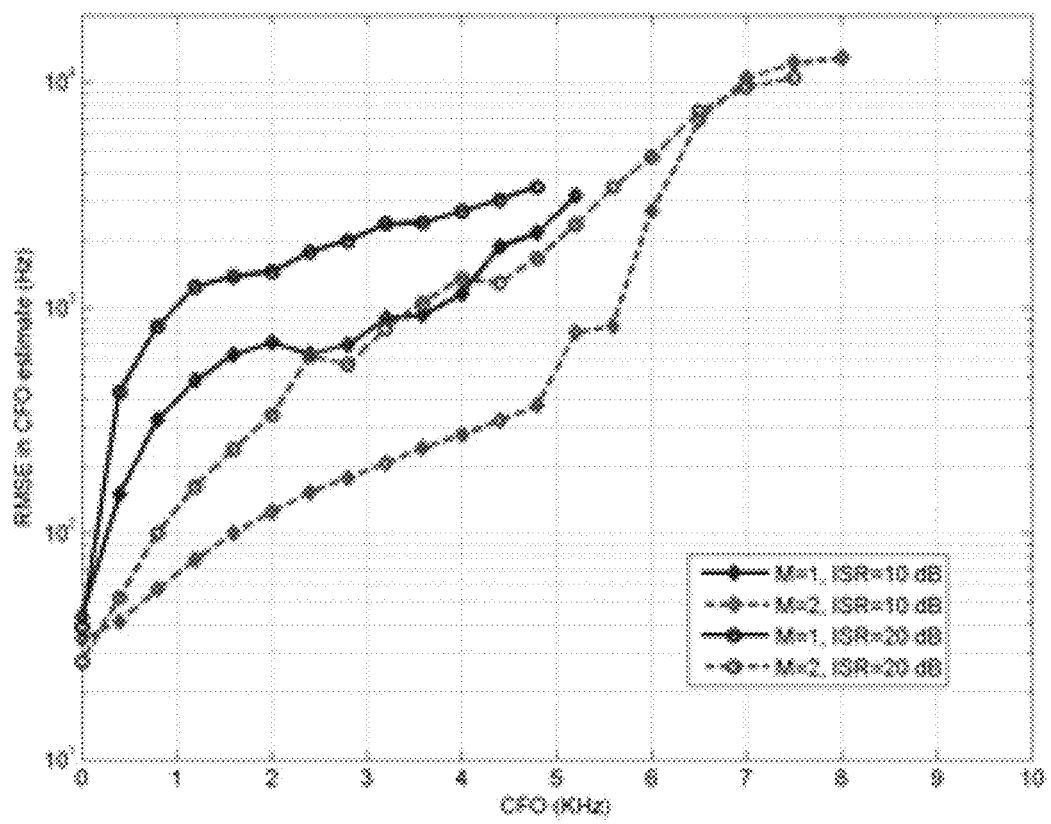
FIG. 13: RMSE in CFO estimate versus CFO.

Next, we investigate the sensitivity of the proposed algorithm to CFO. Since the proposed algorithm performs CFO estimation after PSS and SSS detection and decoding, its performance can be sensitive to CFO errors. As the CFO increases, the received PSS signal deviates more from the stored PSS signatures and the adaptive filter cancels the PSS signal instead of preserving it. The problem is more pronounced in the presence of strong interference where the adaptive filter places deep nulls at the interference signal frequencies which reduces the contribution of the corresponding subcarriers to the PSS detection metric. FIG. 11 and FIG. 12 respectively show the probabilities of detection and false alarm versus CFO at two values of ISR. We can see from these figures that increasing the number of segments from $M=1$ to $M=2$ significantly improves the sensitivity of the algorithm towards CFO due to reducing the maximum deviation from the stored PSS signatures by decreasing the length of the adaptive filter. We can also notice that the sensitivity of the proposed algorithm to CFO increases at higher ISR values. FIG. 13 shows the RMSE in CFO estimate versus CFO computed only over the runs in which correct detection occurred and displayed only when the probability of detection is higher than 0.25. We can see from this figure that the CFO estimate of the proposed algorithm starts to deteriorate as the CFO approaches the detection range of the algorithm. We can also see that increasing the number of segments from $M=1$ to $M=2$ yields improved robustness against CFO errors.

CONCLUSION

A robust synchronization algorithm is presented for LTE systems to detect and eliminate partial-band interference signals via adaptive filtering. The adaptive filter coefficients are designed according to the LCMV design criterion and are updated iteratively using the RLS algorithm. The proposed algorithm utilizes weighted frequency-domain correlation with stored PSS and SSS signatures to detect the cell identity, duplex mode, and CP mode. Weighted frequency domain processing of the received PSS and SSS is also utilized for CFO estimation. Simulation results have been presented to illustrate the superior performance of the proposed algorithm compared to earlier non-robust and robust synchronization algorithms. The proposed algorithm was shown to be able to successfully synchronize to the LTE downlink even in the presence of strong interference signals covering a significant portion of the BW of the LTE synchronization signals.

APPENDIX: EFFECT OF NUMBER OF SEGMENTS ON THE SENSITIVITY TOWARDS CFO MISMATCHES

In order to simplify the analysis, let us consider an additive white Gaussian channel and assume that the received signal does not contain any interference. We can write the mth segment of the N×1 input signal vector corresponding to the transmission of the PSS from an eNodeB with physical-layer identity i as $$y_{(m)}(n_P) = e^{j\frac{2\pi \Delta f(m-1)N}{Mf_s}} Ec_{(m),i} + n_{(m)} \quad (31)$$

where the matrix E is a diagonal matrix of dimension $$\frac{N}{M} \times \frac{N}{M}$$

given by $$E = \text{diag}\left\{1, e^{j\frac{2\pi \Delta f}{f_s}}, \ldots, e^{j\frac{2\pi \Delta f(\frac{N}{M}-1)}{f_s}}\right\} \quad (32)$$

that models progressive phase shift incurred on the received signal due to CFO Δf Hz and we have assumed without loss of generality that the phase shift due to CFO at the first sample of the PSS is equal to zero. In (31), the $$\frac{N}{M} \times 1$$

vector n(m) corresponds to the received noise and is modeled as zero-mean with covariance $$\sigma^2 I_{\frac{N}{M}}$$

and independent of the transmitted LTE downlink signal. The covariance matrix of the vector $y_{(m)}(n_P)$ is given by $$R_{(m)} = Ec_{(m),i}c_{(m),i}^H E^H + \sigma^2 I_{\frac{N}{M}}. \quad (33)$$

The optimal solution of the LCMV problem in (7) can be easily found using the method of Lagrange multipliers and is given by $$g_{(m)}^*(n_P) = \frac{1}{M} R_{(m)}^{-1} C_{(m)} (C_{(m)}^H R_{(m)}^{-1} C_{(m)})^{-1} 1_3. \quad (34)$$

In order to investigate the effect of CFO on the performance of the PSS detection algorithm, let us consider the value of PSS detection metric in (16) when the optimal LCMV filter is utilized and the input to the filter consists of the CFO-distorted PSS signature corresponding to physical-layer identity i. We denote this metric by $u_i^*$ where $$u_i^* = \Sigma_{m=1}^M |g_{(m)}^*(n_P)^H Ec_{(m),i}|. \quad (35)$$

By substituting with (33) in (34) and using the matrix inversion lemma, we can write $u_i^*$ after some mathematical manipulations as $$u_i^* = \frac{1}{M}\sum_{m=1}^{M} \left| \frac{\sigma^2 1_3^T (\tilde{C}_{(m)}^H C_{(m)})^{-1} \tilde{C}_{(m)}^H c_{(m),i}}{\sigma^2 + c_{(m),i}^H P_{\tilde{C}_{(m)}}^\perp c_{(m),i}} \right| \quad (36)$$

where $\tilde{C}_{(m)} = E^H C_{(m)}$ and $P_{\tilde{C}_{(m)}}^\perp$ is the projection matrix on the orthogonal complement of the subspace spanned by the columns of $\tilde{C}_{(m)}$, i.e., $$P_{\tilde{C}_{(m)}}^\perp = I_{\frac{N}{M}} + \tilde{C}_{(m)}(\tilde{C}_{(m)}^H C_{(m)})^{-1} \tilde{C}_{(m)}^H. \quad (37)$$

Figure 14:
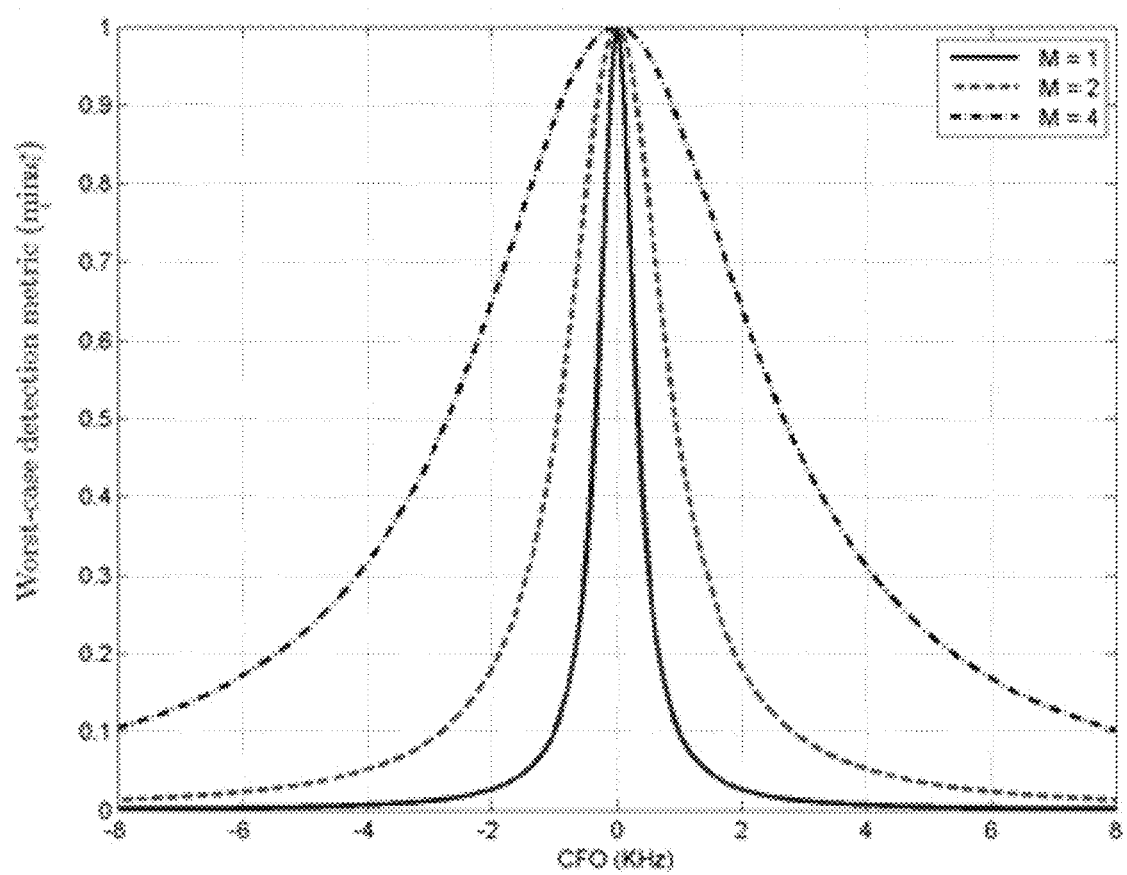
FIG. 14: Sensitivity of detection metric $u_i^*$ towards CFO for different values of M.

In the absence of CFO, i.e., when $$E = I_{\frac{N}{M}},$$

the vector $c_{(m),i}$ lies in the column space of the matrix $\tilde{C}_{(m)}$, and hence, $c_{(m),i}^H P_{\tilde{C}_{(m)}}^\perp c_{(m),i} = 0$. In this case, it can be easily verified that $u_i^* = 1$ for all values of M. In the presence of CFO, the quadratic form $c_{(m),i}^H P_{\tilde{C}_{(m)}}^\perp c_{(m),i}$ is always greater than zero which leads to decreasing the value of $u_i^*$. The decrement in the value of $u_i^*$ increases as the distance between the vector $c_{(m),i}$ and the columnspace of the matrix $\tilde{C}_{(m)}$ increases. As the number of segments M decreases, the length of each segment increases and the maximum phase shift due to CFO increases as can be seen from (32). As a result, the distance between the vector $c_{(m),i}$ and the columnspace of the matrix $\tilde{C}_{(m)}$ increases with increasing the number of segments which leads to decreasing the detection metric $u_i^*$. Increasing the number of segment improves the robustness of the metric $u_i^*$ towards CFO mismatches. FIG. 14 shows the worst-case detection metric over all physical-layer identities, i.e., min $u_i^*$ versus CFO for M=1; 2; 4 where the value of $\sigma^2$ was selected as 0.1. The improvement in the robustness of the proposed algorithm towards CFO with increasing the number of segments can be clearly seen from FIG. 14.

REFERENCES

[1] S. Sesia, I. Toufik, and M. Baker, LTE—The UMTS Long Term Evolution: From Theory to Practice, John Wiley & Sons, second edition, 2011.

[2] "LTE in a nutshell: The physical layer," White paper, Telesystem Innovations, 2010.

[3] A. Paulson and T. Schwengler, "A review of public safety communications, from LMR to voice over LTE (VoLTE)," in IEEE Symposium on Personal, Indoor, and Mobile Radio Communications, September 2013, pp. 3513-3517.

[4] R. Favraud, A. Apostolaras, N. Nikaein, and T. Korakis, "Toward moving public safety networks," IEEE Communications Magazine, vol. 54, no. 3, pp. 14-20, March 2016.

[5] M. Lauridsen, L. C. Gimenez, I. Rodriguez, T. B. Sorensen, and P. Mogensen, "From LTE to 5G for connected mobility," IEEE Communications Magazine, vol. 55, no. 3, pp. 156-162, March 2017.

[6] T. C. Clancy, M. Norton, and M. Lichtman, "Security challenges with LTE-Advanced systems and military spectrum," in IEEE Military Communications Conference, November 2013, pp. 375-381.

[7] X. Li, X. Xie, J. Zeng, and Y. Wang, "Vulnerability analysis and verification for LTE initial synchronization mechanism," in IEEE Sarnoff Symposium, September 2015, pp. 150-154.

[8] M. Lichtman, J. H. Reed, T. C. Clancy, and M. Norton, "Vulnerability of LTE to hostile interference," in IEEE Global Conference on Signal and Information Processing, December 2013, pp. 285-288.

[9] C. Shahriar, M. La Pan, M. Lichtman, T. C. Clancy, R. McGwier, R. Tandon, S. Sodagari, and J. H. Reed, "Phylayer resiliency in OFDM communications: A tutorial," IEEE Communications Surveys & Tutorials, vol. 17, no. 1, pp. 292-314, First quarter 2015.

[10] G. Philippe, F. Montaigne, J. C. Schiel, E. Georgeaux, C. Gruet, P. Y. Roy, P. Force, and P. Mege, "LTE resistance to jamming capability: To which extend a standard LTE system is able to resist to intentional jammers," in Military Communications and Information Systems Conference, October 2013, pp. 1-4.

[11] J. P. Miranda, D. Melgarejo, F. Mathilde, R. Yoshimura, F. A. de Figueiredo, and J. J. Bazzo, "Narrowband interference suppression in long term evolution systems," in IEEE International Symposium on Personal, Indoor, and Mobile Radio Communication, September 2014, pp. 628-632.

[12] H. J. Kwon, J. Jeon, A. Bhorkar, Q. Ye, H. Harada, Y. Jiang, L. Liu, S. Nagata, B. L. Ng, T. Novlan, J. Oh, and W. Yi, "Licensedassisted access to unlicensed spectrum in LTE Release 13," IEEE Communications Magazine, vol. 55, no. 2, pp. 201-207, February 2017.

[13] A. Mukherjee, J. F. Cheng, S. Falahati, L. Falconetti, A. Furuskar, B. Godana, D. H. Kang, H. Koorapaty, D. Larsson, and Y. Yang, "System architecture and coexistence evaluation of licensed-assisted access LTE with IEEE 802.11," in IEEE International Conference on Communication Workshop, June 2015, pp. 2350-2355.

[14] N. Rupasinghe and I. Güvenç, "Licensed-assisted access for WiFi-LTE coexistence in the unlicensed spectrum," in IEEE Globecom Workshops, December 2014, pp. 894-899.

[15] J. Milos and S. Hanus, "Performance analysis of PCFICH and PDCCH LTE control channel," in International Conference on Digital Telecommunications, April 2013, pp. 32-37.

[16] T. C. Clancy, "Efficient OFDM denial: Pilot jamming and pilot nulling," in IEEE International Conference on Communications, June 2011, pp. 1-5.

[17] S. Ohno and G. B. Giannakis, "Optimal training and redundant precoding for block transmissions with application to wireless OFDM," in IEEE International Conference on Acoustics, Speech, and Signal Processing, May 2001, vol. 4, pp. 2389-2392.

[18] Z. Zhang, J. Liu, and K. Long, "Low-complexity cell search with fast PSS identification in LTE," IEEE Transactions on Vehicular Technology, vol. 61, no. 4, pp. 1719-1729, May 2012.

[19] M. Morelli and M. Moretti, "A robust maximum likelihood scheme for PSS detection and integer frequency offset recovery in LTE systems," IEEE Transactions on Wireless Communications, vol. 15, no. 2, pp. 1353-1363, February 2016.

[20] M. Labib, V. Marojevic, J. H. Reed, and A. I. Zaghloul, "How to enhance the immunity of LTE systems against RF spoofing," in International Conference on Computing, Networking and Communications (ICNC), February 2016, pp. 1-5.

[21] H. Minn, V. K. Bhargava, and K. B. Letaief, "A robust timing and frequency synchronization for OFDM systems," IEEE Transactions on Wireless Communications, vol. 2, no. 4, pp. 822-839, July 2003.

[22] M. Marey and H. Steendam, "Analysis of the narrowband interference effect on OFDM timing synchronization," IEEE Transactions on Signal Processing, vol. 55, no. 9, pp. 4558-4566, September 2007.

[23] S. Aghajeri and H. Shafiee, "Synchronization in OFDM powerline communication systems in presence of narrowband interferences," in International Symposium on Signal Processing and Its Applications, July 2003, vol. 2, pp. 359-362.

[24] J. I. Kim, J. S. Han, H. J. Roh, and H. J. Choi, "SSS detection method for initial cell search in 3GPP LTE FDD/TDD dual mode receiver," in International Symposium on Communications and Information Technology, September 2009, pp. 199-203.

[25] Y. Yu and Q. Zhu, "A novel time synchronization for 3GPP LTE cell search," in International ICST Conference on Communications and Networking in China, August 2013, pp. 328-331.

[26] X. Yang, Y. Xiong, G. Jia, W. Fang, and X. Zheng, "PSS based time synchronization for 3GPP LTE downlink receivers," in IEEE International Conference on Communication Technology, September 2011, pp. 930-933.

[27] B. M. Popovic and F. Berggren, "Primary synchronization signal in E-UTRA," in IEEE International Symposium on Spread Spectrum Techniques and Applications, August 2008, pp. 426-430.

[28] H. Setiawan and H. Ochi, "A low complexity physical-layer identity detection for 3GPP long term evolution," in International Conference on Advanced Communication Technology, February 2010, vol. 1, pp. 8-13.

[29] Y. Gao, G. Zhu, X. Chen, D. Wu, and B. Ban, "A modified algorithm of synchronization signal detection for LTE initial cell search," in International ICST Conference on Communications and Networking in China, August 2011, pp. 1211-1215.

[30] K. Manolakis, D. M. G. Estevez, V. Jungnickel, W. Xu, and C. Drewes, "A closed concept for synchronization and cell search in 3GPP LTE systems," in IEEE Wireless Communications and Networking Conference, April 2009, pp. 1-6.

[31] H. G. Park, I. K. Kim, and Y. S. Kim, "Efficient coherent neighbour cell search for synchronous 3GPP LTE system," Electronics Letters, vol. 44, no. 21, pp. 1267-1268, October 2008.

[32] Y. L. Shi, P. L. Shui, and Y. B. Zhao, "Oversampling gain in adaptive normalised matched filter detector," IET Radar, Sonar, and Navigation, vol. 5, no. 9, pp. 987-993, December 2011.

[33] B. R. Breed and J. Strauss, "A short proof of the equivalence of LCMV and GSC beamforming," IEEE Signal Processing Letters, vol. 9, no. 6, pp. 168-169, June 2002.

[34] P. H. Moose, "A technique for orthogonal frequency division multiplexing frequency offset correction," IEEE Transactions on Communications, vol. 42, no. 10, pp. 2908-2914, October 1994.

[35] S. Huang, Y. Su, Y. He, and S. Tang, "Joint time and frequency offset estimation in LTE downlink," in International ICST Conference on Communications and Networking in China, August 2012, pp. 394-398.

[36] R. Krenz and S. Brahma, "Jamming LTE signals," in IEEE International Black Sea Conference on Communications and Networking, May 2015, pp. 72-76.

[37] T. Li, W. H. Mow, V. K. N. Lau, M. Siu, R. S. Cheng, and R. D. Murch, "Robust joint interference detection and decoding for OFDMbased cognitive radio systems with unknown interference," IEEE Journal on Selected Areas in Communications, vol. 25, no. 3, pp. 566-575, April 2007.

[38] Jun Tan and G. L. Stuber, "Multicarrier spread spectrum system with constant envelope: antijamming, jamming estimation, multiuser access," IEEE Transactions on Wireless Communications, vol. 4, no. 4, pp. 1527-1538, July 2005.

[39] D. W. Chi and P. Das, "Effect of jammer on the performance of OFDM in the presence of nonlinearity in Rayleigh fading channel with application to 802.11n WLAN," in IEEE Military Communications conference, October 2006, pp. 1-7.

The invention claimed is:

1. A method for long-term evolution (LTE) synchronization by a signal receiver in a presence of interference signals comprising:
providing multiple parallel adaptive filters to eliminate the contribution of an interference signal to a timing metric of an LTE signal being received;
wherein coefficients of each of said parallel adaptive filters are determined using a linearly constrained minimum variance (LCMV) criterion to minimize output power of each filter subject to the LCMV criterion that preserves received signal vectors of the LTE signal corresponding to all possible primary synchronization signal signatures;
and wherein the coefficients of each adaptive filters are updated iteratively using a recursive least squares (RLS) algorithm.

2. The method of claim 1, wherein a blocking matrix is used to preserve the received signal vectors corresponding to all possible primary synchronization signal signatures.

3. The method of claim 1, further comprising
detecting a primary synchronization signal (PSS) waveform;
detecting a secondary synchronization signal (SSS) waveform;
using said detected primary and secondary synchronization signal waveforms to detect a cell identity, duplex mode and cyclic prefix (CP) mode of the LTE signal.

4. The method of claim 3, further comprising using the PSS and the SSS waveforms for determining a carrier frequency offset (CFO) of the LTE signal.

5. The method of claim 4, wherein the step of updating iteratively further comprises converting the LCMV criterion using an adaptive generalized sidelobe canceller (GSC) process; wherein GSC filter coefficients are updated iteratively using said RLS algorithm.

6. The method of claim 5, wherein the frequency response of said filters at the time of detection of the PSS provides information about the power spectral density (PSD) of the interference signal.

7. The method of claim 6, wherein after detecting the PSS waveform, the method further comprises determining a cross-correlation in the frequency domain between a PSS vector and a PSS signature.

8. The method of claim 7, wherein determining the cross-correlation includes determining a weighted cross-correlation, whereby the magnitude of the frequency response of the LCMV filters at a PSS detection time is used to weight a contribution of different subcarriers to the weighted cross-correlation metric such that the contribution of the interference signal to the cross-correlation metric is eliminated.

9. The method of claim 8, further comprising determining the duplexing and cyclic prefix modes of the LTE system, the physical-layer cell identity and the frame timing information based on the determined PSS and SSS waveforms.

10. The method of claim 9, further comprising estimating the CFO by joint processing of a discrete Fourier transform of the PSS and SSS waveforms in the frequency domain.

11. A system for long-term evolution (LTE) synchronization in a presence of interference signals comprising:
a signal receiver for receiving an LTE signal affected by an interference signal;
multiple parallel adaptive filters to eliminate the contribution of said interference signal to a timing metric of the LTE signal;
wherein coefficients of each of said parallel adaptive filters are determined by the signal processor using a linearly constrained minimum variance (LCMV) criterion to minimize output power of each filter subject to the LCMV criterion that preserves received signal vectors of the LTE signal corresponding to all possible primary synchronization signal signatures;
and wherein the LCMV criterion are updated iteratively using a recursive least squares (RLS) algorithm
a signal recorder for recording an output of said signal processor indicative of said LTE signal with the interference signal removed.

12. The system of claim 11, wherein a blocking matrix is used to preserve the received signal vectors corresponding to all possible primary synchronization signal signatures.

13. The system of claim 11, wherein
said signal processor is configured to detect a primary synchronization signal (PSS) waveform and a secondary synchronization signal (SSS) waveform, and to use said detected primary and secondary synchronization signal waveforms to determine a cell identity, duplex mode and cyclic prefix (CP) mode of the LTE signal.

14. The system of claim 13, wherein said signal processor uses the PSS and the SSS waveforms to determine a carrier frequency offset (CFO) of the LTE signal.

15. The system of claim 14, wherein the signal processor converts the LCMV criterion using an adaptive generalized sidelobe canceller (GSC) process; wherein GSC filter coefficients are updated iteratively using said RLS algorithm.

16. The system of claim 15, wherein the frequency response of said filters at the time of detection of the PSS provides information to the signal processor about the power spectral density (PSD) of the jamming/interference signal.

17. The system of claim 16, wherein signal processor further determines a cross-correlation in the frequency domain between a PSS vector and a PSS signature.

18. The system of claim 17, wherein the cross-correlation is a weighted cross-correlation, whereby the magnitude of the frequency response of the LCMV filters at a PSS detection time is used to weight a contribution of different subcarriers to the weighted cross-correlation metric such that the contribution of the interference signal to the cross-correlation metric is eliminated.

19. The system of claim 18, wherein the signal processor determines the duplexing and cyclic prefix modes of the LTE system, the physical-layer cell identity and the frame timing information based on the determined PSS and SSS waveforms.

20. The system of claim 19, wherein the signal processor estimates the CFO by joint processing of a discrete Fourier transform of the PSS and SSS waveforms in the frequency domain.

* * * * *